US007084996B2

(12) United States Patent
Kubo

(10) Patent No.: US 7,084,996 B2
(45) Date of Patent: Aug. 1, 2006

(54) RECORDING DEVICE

(75) Inventor: Tomoyuki Kubo, Kusagai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 792 days.

(21) Appl. No.: 09/897,095

(22) Filed: Jul. 3, 2001

(65) Prior Publication Data

US 2002/0054311 A1 May 9, 2002

(30) Foreign Application Priority Data

Jul. 4, 2000 (JP) ............................. 2000-202431
Jul. 4, 2000 (JP) ............................. 2000-202432

(51) Int. Cl.
*G06F 15/00* (2006.01)

(52) U.S. Cl. ..................................... 358/1.15; 358/1.13

(58) Field of Classification Search ................. 358/1.1, 358/1.2, 1.3, 1.4, 1.5, 1.8, 1.13; 347/10, 347/11, 15, 9, 12; 349/10

See application file for complete search history.

(56) References Cited

U.S. PATENT DOCUMENTS 5,975,672 A * 11/1999 Wen ............................ 347/15
6,325,478 B1 * 12/2001 Imai et al. ..................... 347/15
6,416,150 B1 * 7/2002 Kimura ........................ 347/14
6,494,554 B1 * 12/2002 Ikemoto et al. ............... 347/10
6,786,564 B1 * 9/2004 Morikawa .................... 347/10
6,830,305 B1 * 12/2004 Takizawa ..................... 347/10

FOREIGN PATENT DOCUMENTS

EP 0 995 599 A2 4/2000
JP A 57-160654 10/1982
JP A 6-155732 6/1994
JP A 11-91143 4/1999
JP A 2000-117980 4/2000

* cited by examiner

*Primary Examiner*—Mark Wallerson

(74) *Attorney, Agent, or Firm*—Oliff & Berridge, PLC

(57) ABSTRACT

Three waveform generators are provided in order to generate three kinds of basic waveform signals. The waveform generators generate the basic waveform signals in correspondence with parameter data inputted from a parameter register. A head driver selects one waveform signal from the basic waveform signals based on image information, and outputs a driving pulse of the same waveform to a corresponding driving element.

26 Claims, 11 Drawing Sheets

| INPUT | | | | | OUTPUT | PRINT WAVEFORM |
|---|---|---|---|---|---|---|
| sel-0 | sel-1 | A | B | C | Y | NO PRINT |
| 0 | 0 | X | X | X | 0 | |
| 0 | 1 | 0 | X | X | 0 | WAVEFORM A |
| 0 | 1 | 1 | X | X | 1 | |
| 1 | 0 | X | 0 | X | 0 | WAVEFORM A |
| 1 | 0 | X | 1 | X | 1 | |
| 1 | 1 | X | X | 0 | 0 | WAVEFORM A |
| 1 | 1 | X | X | 1 | 1 | |

RECORDING DEVICE

BACKGROUND OF THE INVENTION

1. Field of the Invention

The present invention relates to a recording device such as an ink jet recording device. More particularly, the present invention relates to a recording device that can operate in a plurality of recording modes.

2. Description of Related Art

Conventionally, ink jet recording devices are employed in image forming devices such as printers, facsimile machines, and copy machines. There has been proposed an ink jet recording device of a type that controls the waveform of a driving pulse. Control of the driving-pulse waveform can adjust the ink ejection amount or the diameter of an ink dot attached on a recording medium. It is therefore possible to calibrate the variations of ink dots on the recording medium. It is also possible to perform a multi-tone or gradation recording. For example, Japanese Laid-Open Patent Application Kokai No.57-160654 describes driving an electromechanical transducer with driving pulses. The driving pulses are prepared by selecting one or more pulses out of a plurality of pulses in a predetermined pulse train. The electromechanical transducer is provided for each nozzle. The electromechanical transducer allows several ink particles to be ejected from the corresponding nozzle. The ink particles are different in their flying speeds and in their diameters. The ink particles join together into a single ink particle while they fly toward a recording medium. When the single ink particle reaches the recording medium, a single ink dot is produced on the recording medium.

In this type of recording device, a pulse selecting circuit is provided for selecting driving pulses for each nozzle. When the total number of nozzles increases in order to enhance the integrality and the recording density of the recording device, the structure of the pulse-selecting circuit becomes complicated. The entire circuit structure of the driving circuit becomes large. The number of the signal lines increases. The driving circuit becomes expensive.

There has been proposed a recording device of another type that can produce an image tone or gradation without greatly increasing the scale of the driving circuit or the number of signal lines. Representative examples of this type of recording devices are disclosed by Japanese Laid-Open patent application Kokai Nos.11-91143 and 2000-117980. The recording devices disclosed by those publications are provided with several waveform generators. The waveform generators produce several driving waveforms which are different in their pulse widths or in their amplitudes (voltage amounts). A driving waveform selector is provided to select, in accordance with image information, one waveform from the several waveforms. The selected waveform is applied to a driving element such as a piezoelectric actuator, thereby attaining gradation recording.

In order to maintain dot diameters uniform, it is desirable to perform a dot history-based recording control. The dot history-based recording control is performed dependently on whether dots have been recorded or not at the preceding recording operation and on whether dots will be recorded or not at the next recording operation while the recording head is scanned along the main scanning direction. Japanese Laid-Open patent application Kokai No.6-155732 discloses a circuit that attains the dot history-based recording control. The circuit includes several waveform generators which generate several driving waveforms. The circuit also includes a selector which selects a proper driving waveform, among the several driving waveforms, dependently on the dot history of ink ejection.

SUMMARY OF THE INVENTION

Thus, the recording devices of documents Nos.11-91143 and 2000-117980 require waveform generators whose number is equal to the total number of gradations desired. The recording device of document No.6-155732 requires waveform generators whose number is equal to the total number of variations of the dot history-based recording control.

It is desirable that a single recording device can perform both of the multi-tone recording operation and the dot history-based recording operation. However, in order to perform both of the operations, the recording device has to be provided with: the several waveform generators, whose number is equal to the total number of tones or gradations desired; and additionally the several waveform generators, whose number is equal to the total number of variations in the dot history-based recording control. The total number of circuits greatly increases, thereby making large scale the entire driving circuit. The number of the signal lines also increases. The recording device becomes expensive.

It is therefore an objective of the present invention to overcome the above-described problems and to provide an improved recording device that can perform various types of recording operations with a simple structure.

In order to attain the above and other objects, the present invention provides a recording device, comprising: a recording mode setting unit setting a recording mode among a plurality of recording modes; a parameter setting unit setting, according to the set recording mode, one set of parameter signals among a plurality of sets of parameter signals, the plurality sets of parameter signals corresponding to the plurality of recording modes, respectively, each set of parameter signals including several parameter signals; a waveform generating unit receiving the one set of parameter signals set by the parameter setting unit and producing several waveforms based on the received one set of parameter signals; a plurality of selection units, each selection unit selecting, based on pixel image information and the set recording mode, one of the several waveforms which are produced by the waveform generating unit; and a plurality of recording elements which are provided in one to one correspondence with the plurality of selection units, each recording element being supplied with a driving pulse of the one waveform selected by the corresponding selection unit, thereby performing a corresponding dot recording operation.

According to another aspect, the present invention provides a recording device, comprising: a main body which includes a main-body side controller, the main-body side controller being provided with a recording mode setting unit and a parameter setting unit, the recording mode setting unit setting a recording mode among a plurality of recording modes, the parameter setting unit setting, according to the set recording mode, one set of parameter signals among a plurality of sets of parameter signals, the plurality of sets of parameter signals corresponding to the plurality of recording modes, respectively, each set of parameter signals including several parameter signals; a connecting board which includes a waveform generating unit, the waveform generating unit receiving the one set of parameter signals set by the parameter setting unit and producing several waveforms based on the received one set of parameter signals, the waveform generating unit including several waveform generating circuits, each waveform generating circuit receiving a corresponding parameter signal in the one set of parameter signals and producing one waveform that corresponds to the received parameter signal; a carriage which is moved relative to the main body in a main scanning direction; and a recording head unit mounted on the carriage, the recording head unit including a plurality of selection units and a plurality of recording elements, each selection unit selecting, based on pixel image information and the set recording mode, one of the several waveforms which are produced by the waveform generating unit, the plurality of recording elements being provided in one to one correspondence with the plurality of selection units, each recording element being supplied with the one waveform selected by the corresponding selection unit, thereby performing a corresponding dot recording operation, wherein the connecting board is detachably mounted on the carriage in electrical connection with the recording head unit and the main-body side controller.

According to a further aspect, the present invention provides a recording device, comprising: a main body which includes a main-body side controller, the main-body side controller storing pixel image information; a connecting board which includes a waveform generating unit for producing signals of several waveforms, the connecting board including a data path for receiving the pixel image information from the main body; a carriage which is moved relative to the main body in a main scanning direction; and a recording head unit mounted on the carriage, the recording head unit including a plurality of selection units and a plurality of recording elements, each selection unit receiving the pixel image information from the data path in the connecting board and selecting, based on the received pixel image information, one of the several waveform signals which are produced by the waveform generating unit, the plurality of recording elements being provided in one to one correspondence with the plurality of selection units, each recording element being supplied with the one waveform signal selected by the corresponding selection unit, thereby performing a corresponding dot recording operation, wherein the connecting board is detachably mounted on the carriage in electrical connection with the recording head unit and the main-body side controller.

According to still another aspect, the present invention provides a recording device, comprising: a main body transporting a recording medium; a carriage scanned in a main scanning direction with respect to the recording medium; a recording head which is mounted on the carriage and which is provided with a plurality of driving elements, each driving element performing dot-shaped recording on the recording medium upon receipt of a driving pulse; a driver circuit outputting the driving pulse to each of the plurality of driving elements; a controller controlling the driver circuit to output the driving pulse by transmitting a driving signal, representative of image information, to the driver circuit; a parameter input unit inputting parameter data corresponding to the present recording condition among a plurality of recording conditions; and several waveform generators generating several waveforms according to the received parameter data, the driver circuit including a waveform selector selecting, for each of the plurality of driving elements, one of the several waveforms based on the driving signal supplied from the controller and producing the driving pulse of the selected waveform.

According to another aspect, the present invention provides a recording device, comprising: a main body transporting a recording medium; a carriage scanned in a main scanning direction with respect to the recording medium; a recording head which is mounted on the carriage and which is provided with a plurality of driving elements, each driving element performing dot-shaped recording on the recording medium upon receipt of a driving pulse; a driver circuit mounted on either one of the recording head and the carriage, the driver circuit outputting the driving pulse to each of the plurality of driving elements; a main-body side controller, mounted in the main body, controlling the driver circuit to output the driving pulse by transmitting a driving signal, representative of image information, to the driver circuit; a connecting board mounted on the carriage and connected between the driver circuit and the main-body side controller; and several waveform generators, mounted on the connecting board, generating several waveforms, the driver circuit including a waveform selector selecting, for each of the plurality of driving elements, one of the several waveforms based on the driving signal supplied from the main-body controller, and producing the driving pulse of the selected waveform.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENTS

Figure 1:
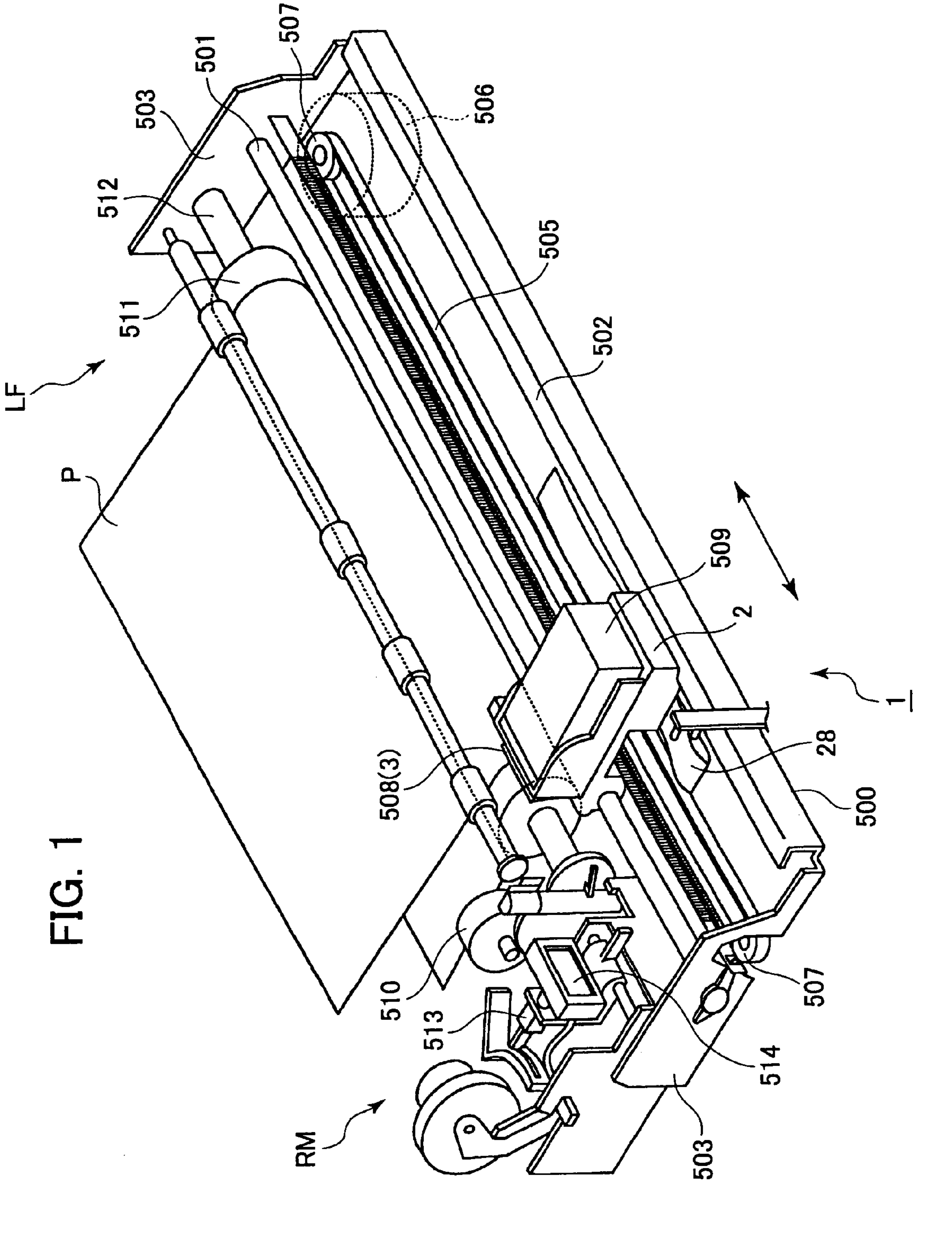
FIG. 1 is a perspective view showing the structure of a recording device according to an embodiment of the present invention.

A recording device according to preferred embodiments of the present invention will be described while referring to the accompanying drawings wherein like parts and components are designated by the same reference numerals to avoid duplicating description.

[First Embodiment]

A first embodiment of the present invention will be described with reference to FIGS. 1–11.

FIG. 1 is a perspective view schematically showing the structure of a recording device 1 of the present embodiment.

The recording device 1 has a main body 500, in which a carriage 2 is movably provided. The carriage 2 is scanned in a widthwise direction of a recording medium (print paper) P as indicated by an arrow in the figure. A recording head (print head) 3 is mounted on the carriage 2. According to the present embodiment, the recording head 3 is an ink jet head. The recording head 3 is provided with a plurality of driving elements 30. In this example, the driving elements 30 are constructed from piezoelectric actuators. While the carriage 2 is being scanned, the plurality of driving elements 30 are selectively applied with driving pulses in accordance with print data, thereby selectively ejecting ink droplets. As a result, a desired image is recorded on the recording medium P.

The main body 500 of the recording device 1 has a pair of side frames 503. A guide rod 501 and a guide member 502 are provided to extend between the pair of side frames 503. The guide rod 501 is of a rod shape whose length is longer than the width of the print paper P. A pair of pulleys 507 are provided at locations near to the opposite ends of the guide rod 501. An endless belt 505 is provided on the pair of pulleys 507. The carriage 2 is fixedly secured to the belt 505, and is supported slidably on the guide rod 501 and the guide member 502. One of the pair of pulleys 507 is connected to a driving shaft of a carriage motor (CR motor) 506. The belt 505 is driven by the CR motor. Accordingly, the carriage 2 is moved reciprocally along the guide rod 501 and the guide member 502.

A print head unit 508 is attached to the carriage 2. The print head unit 508 includes the print head 3 and a head driver 21 to be described later. An ink cartridge 509 is detachably mounted on the carriage 2 at the rear side of the print head unit 508. The ink cartridge 509 serves as an ink supply source supplying ink to each nozzle of the print head 3.

A conveying mechanism LF is provided in the main body 500 of the recording device 1. The conveying mechanism LF is located at a position opposing the print head 3. The conveying mechanism LF is for conveying the print paper P. The conveying mechanism LF includes a platen roller 511. The platen roller 511 has a roller shaft 512, which is rotatably supported on the pair of side frames 503. The platen roller 511 rotates, in association with the driving operation of a conveyance motor (LF motor) 510, and conveys the print paper P.

A maintenance/recovery mechanism RM is provided at one side of the conveyance mechanism LF. The maintenance/recovery mechanism RM is for maintaining and recovering the ink ejection performance of the print head 3. The maintenance/recovery mechanism RM is constructed from a suction mechanism 513 and a cap 514. The suction mechanism 513 sucks ink from nozzles of the print head 3 when the cap 514 is brought into intimate contact with the nozzle plate on the print head 3. The suction mechanism 513 can overcome the poor ink ejection that occurs when ink is dried while the print head 3 is being used, when air bubbles are generated inside the nozzle plate, or when ink droplets are attached to the external surface of the nozzle plate. The cap 514 covers the external surface of the nozzle plate when the recording device 1 is not being used, thereby preventing ink from being dried.

Figure 2:
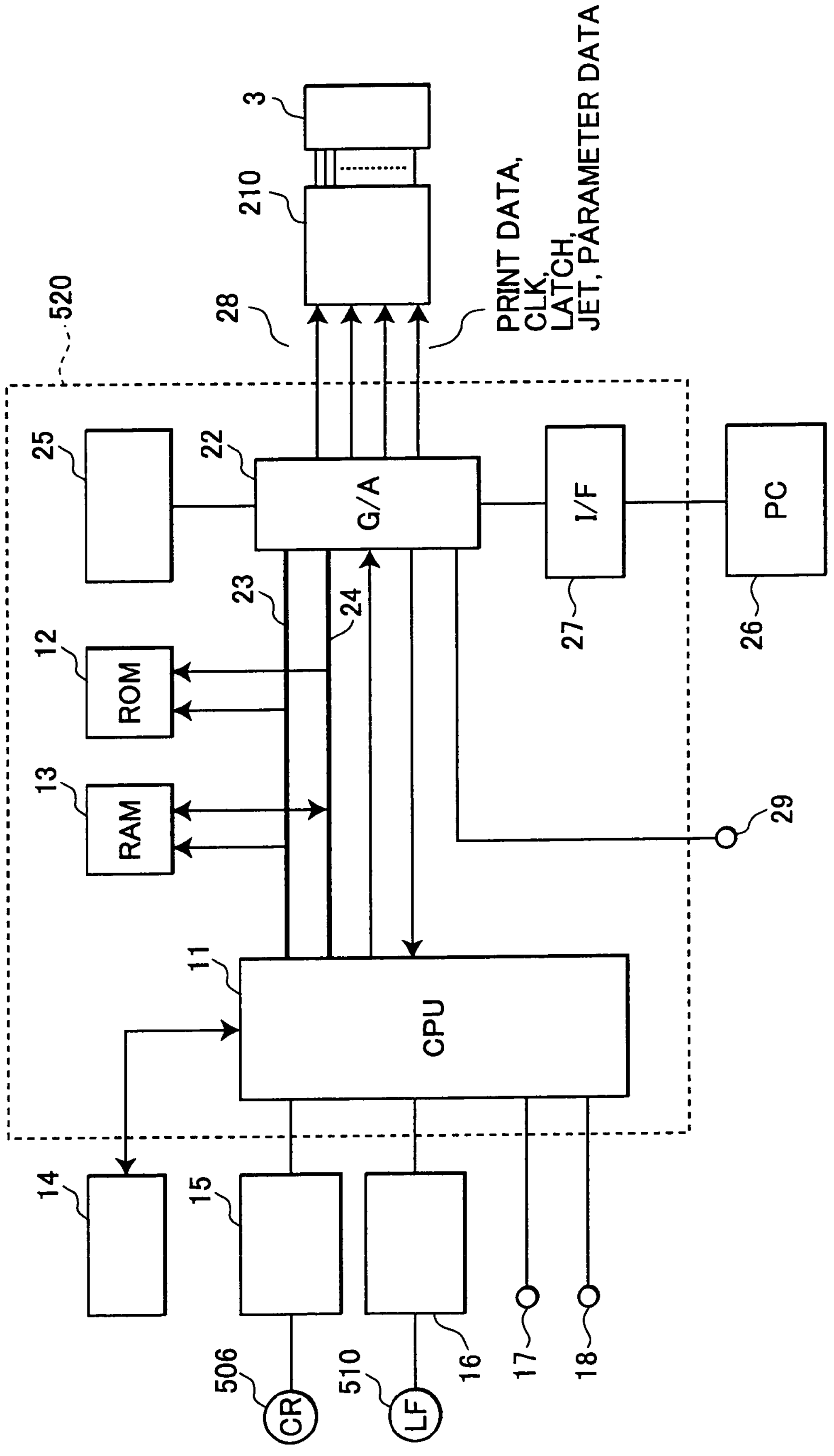
FIG. 2 is a block diagram showing the electric circuit structure of the recording device of FIG. 1.

According to the present embodiment, as shown in FIG. 2, a controller for controlling the recording device 1 is constructed from a main body-side controller board 520 and a carriage board 210. The main body-side controller board 520 is mounted in the main body 500 of the recording device 1. The carriage board 210 is mounted on the carriage 2. The carriage board 210 is electrically connected via a harness cable 28 (FIG. 1) to the main body-side controller board 520. The harness cable 28 is made from a flexible cable.

First, the main body-side controller board 520 will be described with reference to FIG. 2.

The main body-side controller board 520 is provided with a one-chip microcomputer (CPU) 11, a ROM 12, a RAM 13, a gate array 22, an image memory 25, and a Centronics interface 27. The CPU 11 is connected to an operation panel 14, a motor driving circuit 15, another motor driving circuit 16, a paper sensor 17, and an origin sensor 18. A user can manipulate the operation panel 14 to input his/her instruction to the recording device 1. The motor driving circuit 15 is for driving the CR motor 506. The motor driving circuit 16 is for driving the LF motor 510. The paper sensor 17 is for detecting the forward edge of the print paper P. The origin sensor 18 is for detecting the origin position of the carriage 2. The Centronics interface 27 is connected to an external device such as a host computer 26.

The gate array 22 is connected to an encoder sensor 29. The encoder sensor 29 is for detecting the position of the carriage 2 and for outputting a control signal based on the detected results. The CPU 11, the RAM 11, the ROM 12, and the gate array 22 are connected with one another via an address bus 23 and a data bus 24. The ROM 12 stores therein a program. The CPU 11 generates print timing signals and reset signals, while executing the program in the ROM 12. The CPU 11 transfers the print timing signals and the reset signals to the gate array 22.

The ROM 12 also stores therein a plurality of groups of parameter data indicative of a plurality of recording modes of the recording device 1. According to the present embodiment, the recording device 1 can operate in two recording modes: a multi-tone (gradation) recording mode and a high speed mode. Accordingly, the ROM 12 stores therein two groups of parameter data indicative of the two recording modes. Each group of parameter data is constructed from three sets of parameter data Pa, Pb, and Pc. Each group of parameter data (Pa, Pb, Pc) is used for generating pulse signals of three basic waveforms A, B, and C to be used for printing in the corresponding operation mode.

More specifically, one group of parameter data for the multi-tone recording mode is constructed from three sets of parameter data $Pa_{multi\text{-}tone}$, $Pb_{multi\text{-}tone}$, and $Pc_{multi\text{-}tone}$. One group of parameter data for the high speed recording mode is constructed from three sets of parameter data $Pa_{high\text{-}speed}$, $Pb_{high\text{-}speed}$, and $Pc_{high\text{-}speed}$. When a user manipulates the operation panel 14 or controls the host computer 26 to select his/her desired recording mode, the CPU 11 selects the corresponding group of parameter data from the ROM 12, and transfers the parameter data group to the gate array 22. For example, when the user selects the multi-tone recording mode, the CPU 11 selects the group of parameter data ($Pa_{multi\text{-}tone}$, $Pb_{multi\text{-}tone}$, $Pc_{multi\text{-}tone}$), and transfers the parameter data group to the gate array 22. The parameter data $Pa_{multi\text{-}tone}$, $Pb_{multi\text{-}tone}$, and $Pc_{multi\text{-}tone}$ will be used for generating pulse signals of three basic waveforms $A_{multi\text{-}tone}$, $B_{multi\text{-}tone}$, and $C_{multi\text{-}tone}$, shown in FIG. 6, which are used for printing in the multi-tone recording mode. On the other hand, when the user selects the high-speed recording mode, the CPU 11 selects the group of parameter data ($Pa_{high\text{-}speed}$, $Pb_{high\text{-}speed}$, $Pc_{high\text{-}speed}$) and transfers the parameter data group to the gate array 22. The parameter data $Pa_{high\text{-}speed}$, $Pb_{high\text{-}speed}$, and $Pc_{high\text{-}speed}$ will be used for generating pulse signals of three basic waveforms $A_{high\text{-}speed}$, $B_{high\text{-}speed}$, and $C_{high\text{-}speed}$, shown in FIG. 7, which are used for printing in the high-speed recording mode.

The Centronics interface 27 is for transferring, to the gate array 22, image data transmitted from an external device such as the host computer 26. The gate array 22 transfers the received image data to the image memory 25. The image memory 25 temporarily stores the image data.

Based on the image data and on the selected group of parameter data (Pa, Pb, Pc), the gate array 22 outputs print data (driving signals), transfer clock signals CLK, latch signals, the group of parameter data (Pa, Pb, Pc), and ejection timing signals JET, in accordance with the control signals from the encoder sensor 29 and the print timing signals from the CPU 11. The gate array 22 outputs those signals to the carriage board 210 via the harness cable 28.

The print data (driving signals) is for forming an image, represented by the image data, on the recording medium P according to the present recording mode. The print data includes, for each pixel, one-bit data "sel-0 (=0 or 1)" and one-bit data "sel-1 (=0 or 1)". The gate array 22 outputs the print data while synchronously outputting the transfer clock signals CLK. The gate array 22 outputs the group of parameter data (Pa, Pb, Pc) which is selected by the CPU 11. The gate array 12 outputs the ejection timing signals JET at a regular interval.

The gate array 22 receives Centronics data via the Centronics interface 27 from the external device such as the host computer 26. Based on the Centronics data, the gate array 22 generates Centronics data reception interrupt signals. The gate array 22 transfers the Centronics data reception interrupt signals to the CPU 11.

Next, the carriage board 210 will be described with reference to FIG. 3.

The carriage board 210 is provided with: a head driver 21, a parameter register 36, and a plurality of (three, in this example) waveform generators 35*a*, 35*b*, and 35*c*.

The parameter register 36 is for receiving one group of parameter data (Pa, Pb, Pc) transmitted from the gate array 22. The parameter register 36 holds the received one group of parameter data (Pa, Pb, Pc). The parameter register 36 outputs the parameter data Pa, Pb, and Pc to the waveform generators 35*a*, 35*b*, and 35*c*, respectively. It is noted that the parameter data Pa, Pb, and Pc held in the parameter register 36 can be rewritten in response to an instruction from the gate array 22. Accordingly, when the recording mode is changed from one recording mode to the other recording mode, the gate array 22 transmits parameter data (Pa, Pb, Pc) for the new recording mode and a content-rewriting instruction to the parameter register 36. Receiving the new parameter data and the content-rewriting instruction, the parameter register 36 holds the new parameter data Pa, Pb, and Pc.

For example, the parameter register 36 can be constructed from a shift register. In this case, the gate array 22 can serially transmit the one group of parameter data (Pa, Pb, Pc) to the parameter register 36. The total number of signal lines in the harness cable 28 can be reduced.

The parameter register 36 may be constructed from a non-volatile, rewritable memory such as an EEPROM. In this case, the parameter register 36 can hold the group of parameter data (Pa, Pb, Pc) even when the power source of the recording device 1 is temporarily shut down due to various causes, such as an erroneous manipulation by a user, due to a thunderbolt. In this case, after the power source of the recording device 1 is turned on, the parameter register 36 does not need to read a parameter data group again.

The waveform generators 35*a*, 35*b*, and 35*c* are for receiving the parameter data Pa, Pb, and Pc, respectively, from the parameter register 36. The waveform generator 35*a* is for generating a pulse signal of a first basic waveform (print waveform signal) A based on the received parameter data Pa. The waveform generator 35*b* is for generating a pulse signal of a second basic waveform (print waveform signal) B based on the received parameter data Pb. The waveform generator 35*c* is for generating a pulse signal of a third basic waveform (print waveform signal) C based on the received parameter data Pc.

Figure 6:
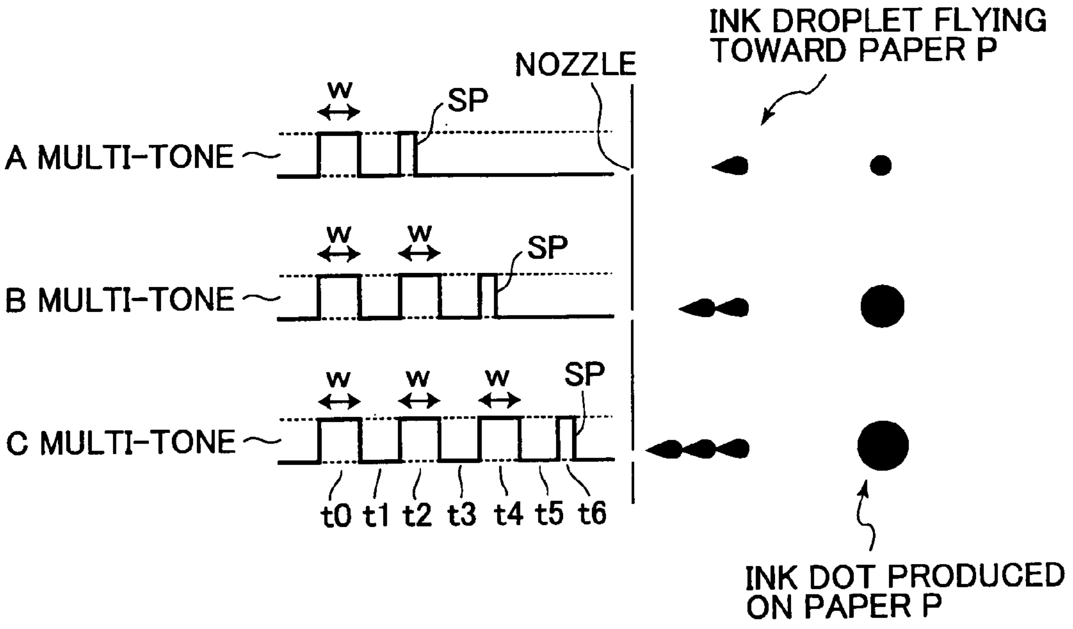
FIG. 6 shows driving pulses in several waveforms, which are employed during a multi-tone mode, and shows how the driving pulses allow ink to fly and to be attached on a sheet of paper.
Figure 7:
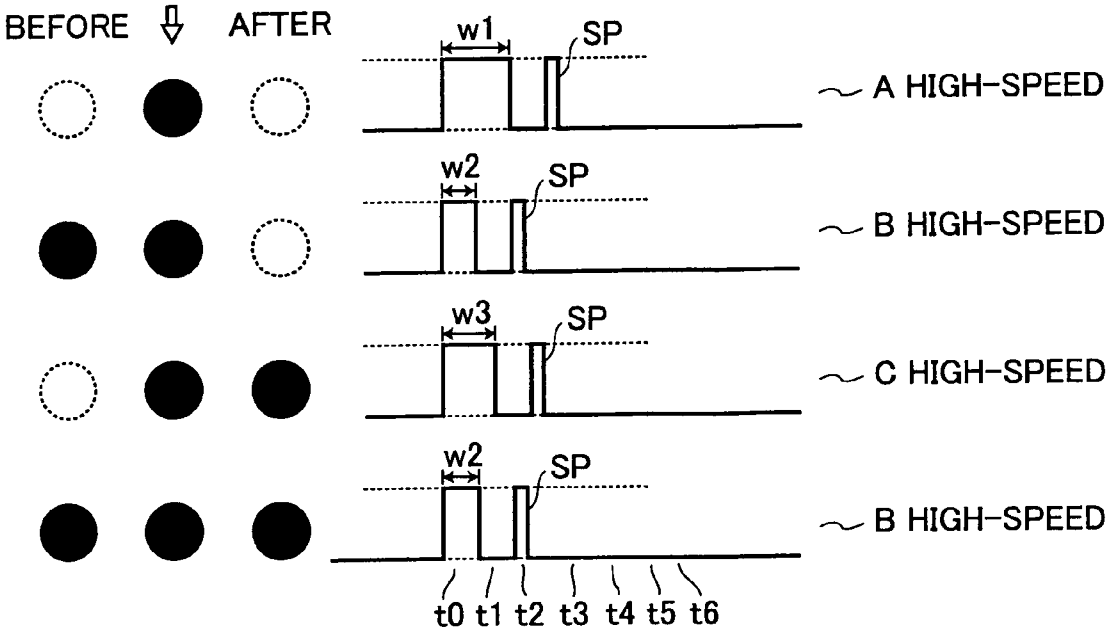
FIG. 7 shows driving pulses in several waveforms, which are employed during a high-speed mode, and shows how the driving pulses allow ink to fly and to be attached on a sheet of paper.

More specifically, when the multi-tone mode is selected, the waveform generators 35*a*–35*c* receive the parameter data $Pa_{multi\text{-}tone}$, $Pb_{multi\text{-}tone}$ and $Pb_{multi\text{-}tone}$, respectively. Accordingly, the waveform generators 35*a*–35*c* generate pulse signals of first through third basic waveforms $A_{multi\text{-}tone}$, $B_{multi\text{-}tone}$, and $C_{multi\text{-}tone}$ as shown in FIG. 6. On the other hand, when the high-speed mode is selected, the waveform generators 35*a*–35*c* receive parameter data $Pa_{high\text{-}speed}$, $Pb_{high\text{-}speed}$, and $Pb_{high\text{-}speed}$, respectively. Accordingly, the waveform generators 35*a*–35*c* generate pulse signals of first through third basic waveforms $A_{high\text{-}speed}$, $B_{high\text{-}speed}$, and $C_{high\text{-}speed}$ as shown in FIG. 7.

Next, the first through third basic waveforms $A_{multi\text{-}tone}$, $B_{multi\text{-}tone}$, and $C_{multi\text{-}tone}$ will be described in greater detail with reference to FIG. 6.

During the multi-tone mode, in order to drive a driving element 30 to print an ink dot of the smallest diameter, the driving element 30 should be applied with a driving pulse of the first basic waveform $A_{multi\text{-}tone}$. The first waveform $A_{multi\text{-}tone}$ has only one ejection pulse with a predetermined pulse width "w". In this case, the driving element 30 actuates to eject only one ink droplet from the corresponding nozzle. The one ink droplet flies from the nozzle toward the sheet of paper P. The ink droplet is attached onto the sheet to produce an ink dot of the smallest diameter.

In order to drive a driving element 30 to print an ink dot of a larger diameter, the driving element 30 is applied with a driving pulse of the second basic waveform $B_{multi\text{-}tone}$. The waveform $B_{multi\text{-}tone}$ has a train of two ejection pulses. Each pulse has the same predetermined pulse width "w". In this case, the driving element 30 actuates to successively eject two ink droplets from the corresponding nozzle. The two ink droplets successively fly from the nozzle toward the sheet of paper P. The ink droplets are attached on the sheet one on the other to produce a composite dot of the larger diameter.

In order to drive a driving element 30 to print an ink dot of the largest diameter, the driving element 30 is applied with a driving pulse of the third basic waveform $C_{multi\text{-}tone}$. The waveform $C_{multi\text{-}tone}$ has a train of three ejection pulses. Each pulse has the same predetermined pulse width "w". In this case, the driving element 30 actuates to eject three ink droplets from the corresponding nozzle. The three ink droplets successively fly from the nozzle toward the sheet of paper P. The ink droplets are attached on the sheet one on another to produce a composite dot of the largest diameter.

It is noted that each of the waveforms $A_{multi\text{-}tone}$, $B_{multi\text{-}tone}$, and $C_{multi\text{-}tone}$ has a stop pulse SP at a trailing end of the train of one or more ejection pulses. Each of the first through third waveforms $A_{multi\text{-}tone}$, $B_{multi\text{-}tone}$, and $C_{multi\text{-}tone}$ has one or more ejection pulses for producing one or more ink droplets. The thus produced one or more ink droplets fly toward the print paper P and are then attached on the surface of the print paper P at the same position. As a result, an ink dot, whose size corresponds to the total number of the ink droplets, are produced on the print paper P. As the number of the ejection pulses increases, the size of the dot increases. Thus, by selecting the waveform among the first through third waveforms $A_{multi-tone}$, $B_{multi-tone}$, and $C_{multi-tone}$, it is possible to control the size of one dot. It is therefore possible to easily perform gradation control of the print density at each nozzle.

The stop pulse SP can suppress oscillation of ink which remains in the nozzle after one or more ink droplets are ejected. The nozzle ejects no ink droplet in accordance with the stop pulse SP. The stop pulse SP can therefore prevent any ink droplets from being erroneously ejected after desired one or more ink droplets are ejected. The stop pulse SP can also prevent the present ejection of ink droplets from affecting any adverse effects to the next dot printing operation.

Next, the first through third basic waveforms $A_{high-speed}$, $B_{high-speed}$, and $C_{high-speed}$ will be described in greater detail with reference to FIG. 7.

It is noted that while the carriage 2 is scanned in the main scanning direction, each driving element 30 in the print head 3 is repetitively driven to print or not to print ink dots. During the high-speed mode, the carriage 2 is scanned at a high speed. Accordingly, each driving element 30 is repetitively driven at a very short time interval. In order to control each driving element 30 to produce an ink dot of a uniform diameter, a dot history-based control should be employed during the high-speed mode.

According to the dot history-based control, as shown in FIG. 7, in order to drive a driving element 30 to print an ink dot when the driving element 30 has ejected no ink droplet in the previous printing operation and will also eject no ink droplet in the next printing operation, the driving element 30 should be applied with a driving pulse of the first basic waveform $A_{high-speed}$. It is noted that in the figure, the black solid dot indicates that a droplet ejection is performed, while a white dot indicates that no droplet ejection is performed. The first waveform $A_{high-speed}$ has one ejection pulse with a pulse width of w1 and a stop pulse SP.

In order to drive a driving element 30 to print an ink dot when the driving element 30 has ejected an ink droplet in the previous printing operation but will eject no ink droplet in the next printing operation, the driving element 30 is applied with a driving pulse of the second basic waveform $B_{high-speed}$. The second waveform $B_{high-speed}$ has one ejection pulse with another pulse width of w2 and a stop pulse SP. It is noted that the length of w2 is smaller than the length of w1.

In order to drive a driving element 30 to print an ink dot when the driving element 30 has ejected no ink droplet in the previous printing operation but will eject an ink droplet in the subsequent printing operation, the driving element 30 is applied with a driving pulse of the third basic waveform $C_{high-speed}$. The waveform $C_{high-speed}$ has one ejection pulse with still another pulse width of w3 and a stop pulse SP. The length of w3 satisfies the following inequality: $w2<w3<w1$.

In order to drive a driving element 30 to print an ink dot when the driving element 30 has ejected an ink droplet in the previous printing operation and will also eject an ink droplet in the subsequent printing operation, the driving element 30 is applied with a driving pulse of the second basic waveform $B_{high-speed}$.

It is noted that during the high-speed mode, each driving element 30 repetitively performs ink droplet ejection operation at a short period (high frequency) Accordingly, oscillation of ink produced during the present ink ejection operation will remain in the nozzle and affect the next ink ejection operation. By selecting a proper waveform for the present ejection in accordance with whether ink droplets are ejected before and after the present operation, it is possible to reduce the effects of the oscillation of ink. It is possible to make dot diameters substantially uniform. Accordingly, during the high-speed mode, each driving element 30 is driven with a driving pulse of a proper pulse width in accordance with whether or not the driving element 30 performs ejection operation immediately before and after the present ejection operation.

As apparent from FIGS. 6 and 7, each waveform can be represented by the lengths of the seven successive time portions "t0"–"t6". Of the seven successive time portions "t0"–"t6", time portions "t0", "t2", "t4", and "t6" are for generating high levels (pulses), while the remaining time portions "t1", "t3", and "t5" are for generating low levels.

In order to indicate the waveform $A_{multi-tone}$, the parameter data $Pa_{multi-tone}$ is constructed from seven sets of eight-bit data indicative of the lengths of the seven successive time portions "t0"–"t6" of the waveform $A_{multi-tone}$. Similarly, in order to indicate the waveform $B_{multi-tone}$, the parameter data $Pb_{multi-tone}$ is constructed from seven sets of eight-bit data indicative of the lengths of the seven successive time portions "t0"–"t6" of the waveform $B_{multi-tone}$. Similarly, in order to indicate the waveform $C_{multi-tone}$, the parameter data $Pc_{multi-tone}$ is constructed from seven sets of eight-bit data indicative of the lengths of the seven successive time portions "t0"–"t6" of the waveform $C_{multi-tone}$.

For example, the first eight-bit data in the parameter data $Pa_{multi-tone}$ is a value of "00111111" indicative of the length "w" of the time portion "t0" of the waveform $A_{multi-tone}$. Similarly, the first and third eight-bit data in the parameter data $Pb_{multi-tone}$ are the value of "00111111" indicative of the lengths "w" of the time portions "t0" and "t2" of the waveform $B_{multi-tone}$. Similarly, the first, third, and fifth eight-bit data in the parameter data $Pc_{multi-tone}$ are the value of "00111111" indicative of the lengths "w" of the time portions "t0", "t2", and "t4" of the waveform $C_{multi-tone}$.

It is noted that in the waveform $A_{multi-tone}$, no pulse is generated in the time portion "t4" or "t6". Accordingly, the fifth and seventh eight-bit data, which are indicative of the lengths of the time portions "t4" and "t6" of the waveform $A_{multi-tone}$, are zero ("00000000"). Similarly, in the waveform $B_{multi-tone}$, no pulse is generated in the time portion "t6". Accordingly, the seventh eight-bit data indicative of the length of the time portion "t6" of the waveform $B_{multi-tone}$ is also zero ("00000000").

Similarly, in order to indicate the waveform $A_{high-speed}$, the parameter data $Pa_{high-speed}$ is constructed from seven sets of eight-bit data indicative of the lengths of the seven successive time portions "t0"–"t6" of the waveform $A_{high-speed}$. In order to indicate the waveform $B_{high-speed}$, the parameter data $Pb_{high-speed}$ is constructed from seven sets of eight-bit data indicative of the lengths of the seven successive time portions "t0"–"t6" of the waveform $B_{high-speed}$. In order to indicate the waveform $C_{high-speed}$, the parameter data $Pc_{high-speed}$ is constructed from seven sets of eight-bit data indicative of the lengths of the seven successive time portions "t0"–"t6" of the waveform $C_{high-speed}$.

For example, the first eight-bit data in the parameter data $Pa_{high-speed}$ is a value of "11111111" indicative of the length "w1" of the time portion "t0" of the waveform $A_{high-speed}$. Similarly, the first eight-bit data in the parameter data $Pb_{high-speed}$ is the value of "00111111" indicative of the length "w2" of the time portion "t0" of the waveform $B_{high-speed}$. Similarly, the first eight-bit data in the parameter data $Pc_{high-speed}$ is the value of "01111111" indicative of the length "w3" of the time portion "t0" of the waveform $C_{high\text{-}speed}$. It is noted that in each of the waveforms $A_{high\text{-}speed}$, $B_{high\text{-}speed}$, and $C_{high\text{-}speed}$, no pulse is generated in the time portion "t4" or "t6". Accordingly, the fifth and seventh eight-bit data indicative of the lengths of the time portions "t4" and "t6" of the waveforms $A_{high\text{-}speed}$, $B_{high\text{-}speed}$, and $C_{high\text{-}speed}$ are zero ("00000000").

Next, the parameter register 36 will be described in greater detail with reference to FIG. 4.

Figure 4:
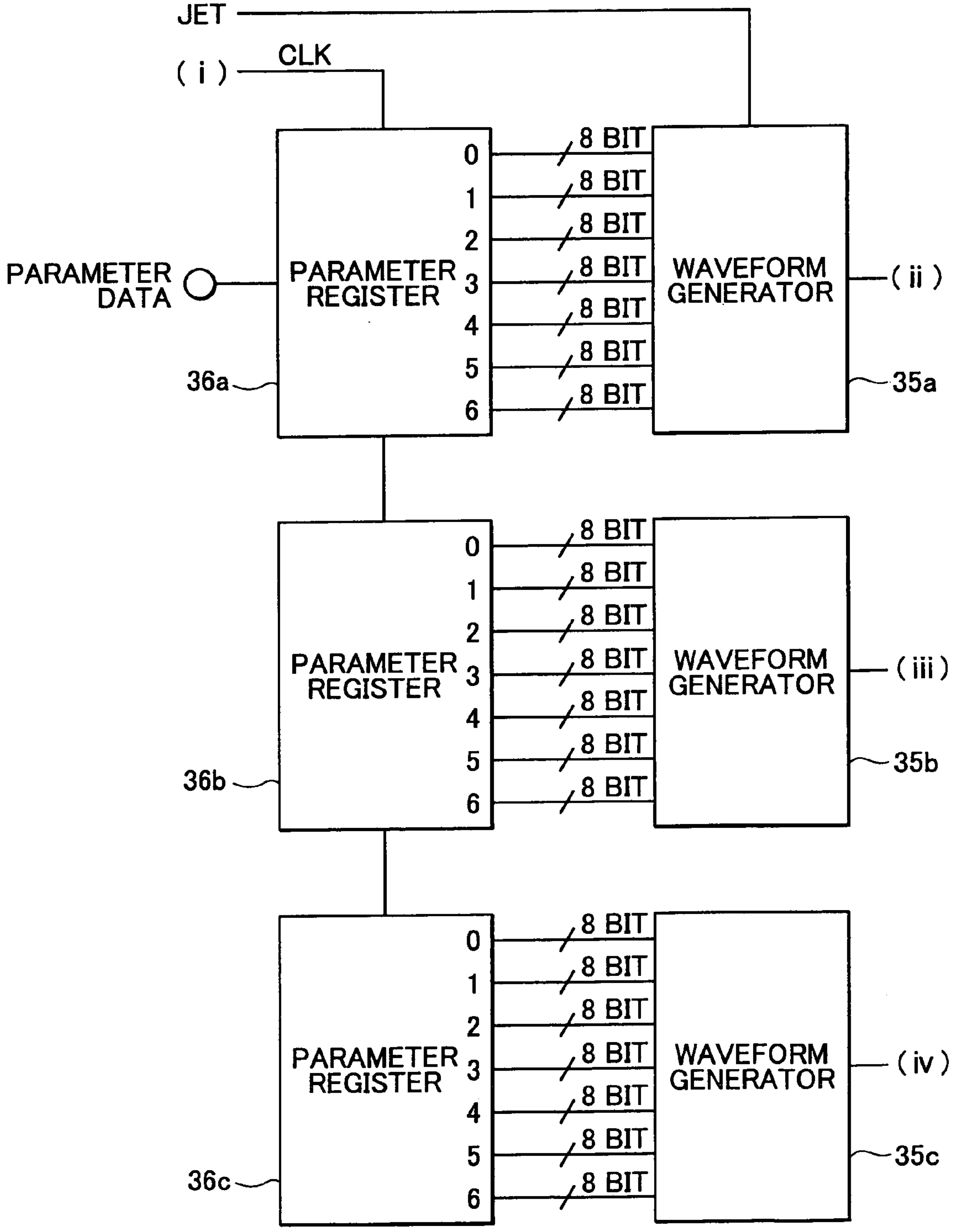
FIG. 4 is a block diagram showing the circuit structure of a parameter register and waveform generators in FIG. 3.

As shown in FIG. 4, the parameter register 36 has three sections 36*a*, 36*b*, and 36*c*, which are connected to the waveform generators 35*a*, 35*b*, and 35*c*, respectively. Each section 36*a*, 36*b*, and 36*c* has seven output terminals "0"–"6".

During the multi-tone mode, the parameter register 36 receives the parameter data $Pa_{multi\text{-}tone}$, $Pb_{multi\text{-}tone}$, and $Pc_{multi\text{-}tone}$ from the gate array 22. The parameter register section 36*a* holds the seven sets of eight-bit data in the parameter data $Pa_{multi\text{-}tone}$ and outputs the seven sets of eight-bit data at the seven output terminals "0"–"6", respectively. Receiving the seven sets of eight-bit data from the output terminals "0"–"6", the waveform generator 35*a* successively generates the time portions "t0"–"t6" of the waveform $A_{multi\text{-}tone}$ in synchronization with the operation of an internal timer installed in the waveform generator 35*a*.

The parameter register section 36*b* holds the seven sets of eight-bit data in the parameter data $Pb_{multi\text{-}tone}$, and outputs the seven sets of eight-bit data at the seven output terminals "0"–"6", respectively. Receiving the seven sets of eight-bit data from the output terminals "0"–"6", the waveform generator 35*b* successively generates the time portions "t0"–"t6" of the waveform $B_{multi\text{-}tone}$ in synchronization with the operation of an internal timer installed in the waveform generator 35*b*.

The parameter register section 36*c* holds the seven sets of eight-bit data in the parameter data $Pc_{multi\text{-}tone}$, and outputs the seven sets of eight-bit data at the seven output terminals "0"–"6", respectively. Receiving the seven sets of eight-bit data from the output terminals "0"–"6", the waveform generator 35*c* successively generates the time portions "t0"–"t6" of the waveform $C_{multi\text{-}tone}$ in synchronization with the operation of an internal timer installed in the waveform generator 35*c*.

During the high-speed mode, the parameter register 36 receives the parameter data $Pa_{high\text{-}speed}$, $Pb_{high\text{-}speed}$, and $Pc_{high\text{-}speed}$ from the gate array 22. The parameter register section 36*a* holds the seven sets of eight-bit data in the parameter data $Pa_{high\text{-}speed}$, and outputs the seven sets of eight-bit data at the seven output terminals "0"–"6", respectively. Receiving the seven sets of eight-bit data from the output terminals "0"–"6", the waveform generator 35*a* successively generates the time portions "t0"–"t6" of the waveform $A_{high\text{-}speed}$ in synchronization with the operation of the internal timer in the waveform generator 35*a*.

The parameter register section 36*b* holds the seven sets of eight-bit data in the parameter data $Pb_{high\text{-}speed}$, and outputs the seven sets of eight-bit data at the seven output terminals "0"–"6", respectively. Receiving the seven sets of eight-bit data from the output terminals "0"–"6", the waveform generator 35*b* successively generates the time portions "t0"–"t6" of the waveform $B_{high\text{-}speed}$ in synchronization with the operation of the internal timer in the waveform generator 35*b*.

The parameter register section 36*c* holds the seven sets of eight-bit data in the parameter data $Pc_{high\text{-}speed}$, and outputs the seven sets of eight-bit data at the seven output terminals "0"–"6", respectively. Receiving the seven sets of eight-bit data from the output terminals "0"–"6", the waveform generator 35*c* successively generates the time portions "to"–"t6" of the waveform $C_{high\text{-}speed}$ in synchronization with the operation of the internal timer in the waveform generator 35*c*.

Thus, during the multi-tone recording mode, the parameter register section 36*a* outputs, at the terminals 0–6, data indicative of the lengths of the successive time portions of the waveform $A_{multi\text{-}tone}$ of FIG. 6. Accordingly, the waveform generator 35*a* generates the waveform $A_{multi\text{-}tone}$. The parameter register section 36*b* outputs, at the terminals 0–6, data indicative of the lengths of the successive time portions of the waveform $B_{multi\text{-}tone}$. Accordingly, the waveform generator 35*b* generates the waveform $B_{multi\text{-}tone}$. The parameter register section 36*c* outputs, at the terminals 0–6, data indicative of the lengths of the successive time portions of the waveform $C_{multi\text{-}tone}$. Accordingly, the waveform generator 35*c* generates the waveform $C_{multi\text{-}tone}$. In this way, the waveform generators 35*a*–35*c* produce the waveforms $A_{multi\text{-}tone}$, $B_{multi\text{-}tone}$, and $C_{multi\text{-}tone}$.

During the high speed printing mode, the parameter register section 36*a* outputs, at the terminals 0–6, data indicative of the lengths of the successive time sections of the waveform $A_{high\text{-}speed}$ of FIG. 7. For example, the parameter register section 36*a* outputs, at the terminal 0, eight bit data "11111111" indicative of the length of the width "w1". Accordingly, the waveform generator 35*a* generates the waveform $A_{high\text{-}speed}$ of FIG. 7 whose pulse width at the time portion "0" is set to "w1". The parameter register section 36*b* outputs, at the terminals 0–6, data indicative of the lengths of the successive time sections of the waveform $B_{high\text{-}speed}$ of FIG. 7. For example, the parameter register section 36*b* outputs, at the terminal 0, eight bit data "00111111" indicative of the length of the width "w2". Accordingly, the waveform generator 35*b* generates the waveform $B_{high\text{-}speed}$ of FIG. 7 whose pulse width at the time section "0" is set to w2. The parameter register section 36*c* outputs, at the terminals 0–6, data indicative of the lengths of the successive time sections of the waveform $C_{high\text{-}speed}$ of FIG. 7. For example, the parameter register section 36*c* outputs, at the terminal 0, eight bit data "01111111" indicative of the length of the width "w3". Accordingly, the waveform generator 35*c* generates the waveform $C_{high\text{-}speed}$ of FIG. 7 whose pulse width at the time portion "0" is set to w3.

Figure 5:
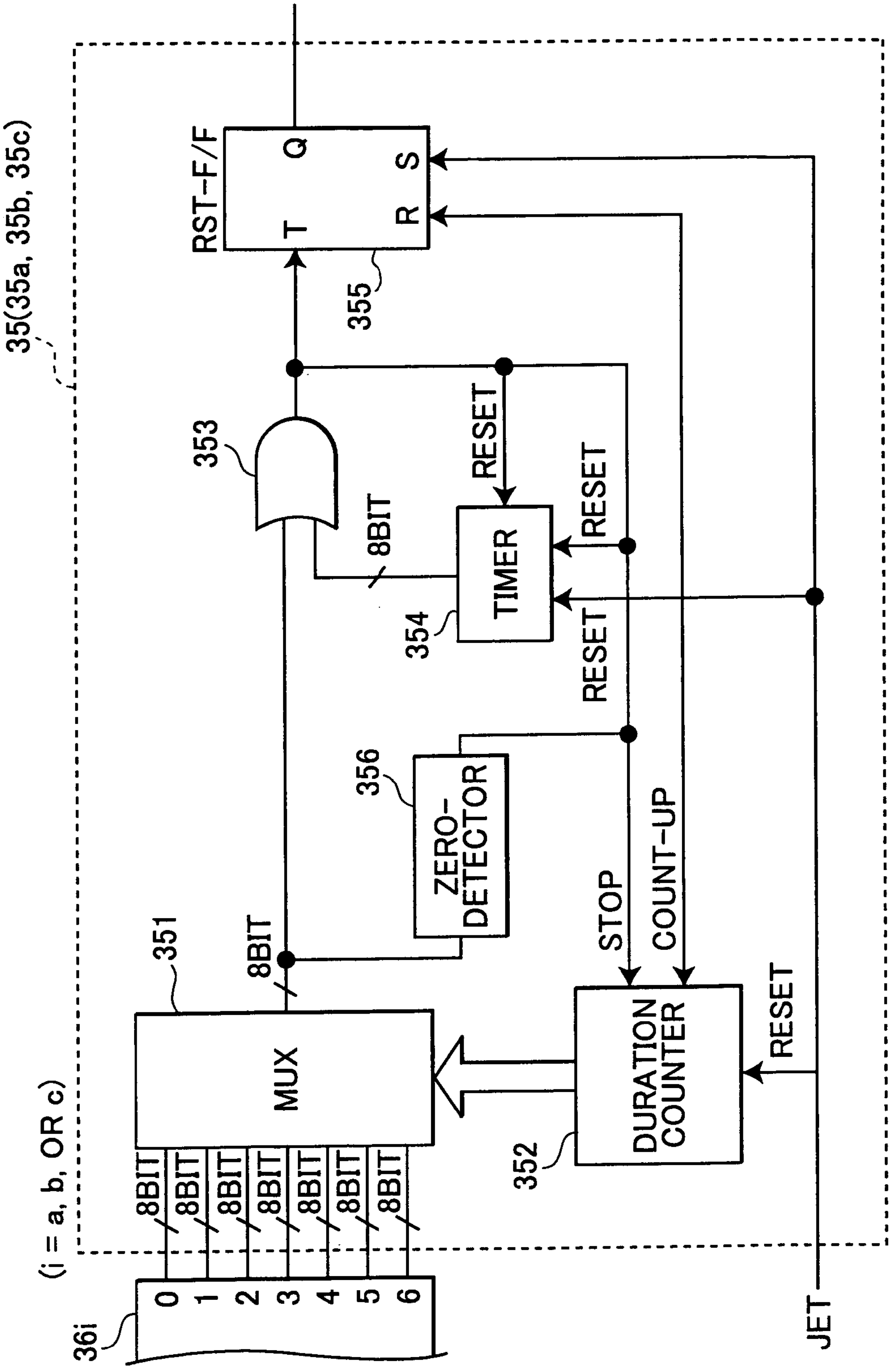
FIG. 5 is a block diagram showing the circuit structure of each waveform generator.

Next, the waveform generators 35*a*, 35*b*, and 35*c* will be described in greater detail with reference to FIG. 5. The waveform generators 35*a*, 35*b*, and 35*c* have the same circuit structure as shown in FIG. 5. With this structure, each waveform generator 35*i* (i=a, b, or c) can generate a waveform with a pulse number and a pulse width designated by a set of parameter data $Pi_m$ (i=a, b, or c; m=multi-tone or high-speed) inputted therein.

The waveform generator 35*i* (i=a, b, or c) includes: a multiplexer 351; a duration counter 352; a comparator 353; a timer 354; a RST-F/F (RST-flip-flop) circuit 355; and a zero detector 356. The duration counter 352 and the RST-F/F circuit 355 are for receiving a JET signal which is repetitively outputted at a fixed time interval from the gate array 21. Upon receipt of the JET signal, the duration counter 352 is reset, and the RST-F/F circuit 355 is set to output a high level.

The multiplexer 351 is for receiving the seven sets of eight-bit data from the seven output terminals "0"–"6" of the corresponding parameter register section 36*i* (i=a, b, or c). The multiplexer 351 first outputs the first set of eight-bit data, which is received from the first output terminal "0", to one of a pair of input terminals of the comparator 353. The other input terminal of the comparator 353 is connected to an output terminal of the timer 354. The timer 354 is for being reset by the JET signal and for counting up immediately thereafter. The comparator 353 is for outputting a matching signal (H) to a trigger input terminal (T) of the RST-F/F circuit 355 when the value counted by the timer 354 matches a value indicated by the eight-bit data inputted from the multiplexer 351. Upon receipt of the matching signal (H), the output of the RST-F/F circuit 355 switches from the high level into the low level. The comparator 353 outputs the matching signal (H) also to the duration counter 352 and to the timer 354. Upon receipt of the matching signal (H), the duration counter 352 counts up, and instructs the multiplexer 351 to output the next (second, in this case) set of eight-bit data, which is inputted from the next (second) output terminal "1" of the parameter register section 36*i*. Upon receipt of the matching signal (H), the timer 354 is reset and restarts counting immediately thereafter. The value counted by the timer 354 matches the second set of eight-bit data, the comparator 353 again generates a matching signal (H). The matching signal (H) is inputted to the trigger input terminal (T) of the RST-F/F circuit 355. As a result, the output of the RST-F/F circuit 355 switches from the low level back to the high level. In this way, the RST-F/F circuit 355 outputs the low level signal and the high level signal in alternation.

The zero detector 356 is for detecting whether eight-bit data, which is outputted from the multiplexer 351 at the first, third, fifth, or seventh timing, i.e., in the odd-numbered timing, is zero (0). That is, the zero detector 356 detects whether eight-bit data, which is inputted from the even-numbered terminal ("0", "2", "4", or "6") of the corresponding parameter register section 35*i* (i=a, b, or c) is zero (0). When the zero detector 356 detects that zero is outputted in the odd-numbered timing, the zero detector 356 outputs a stop signal to the duration counter 352, and resets the RST-F/F circuit 355. In this way, the waveform generator 35*i* (i=a, b, or c) can produce any desired waveform, as shown in FIGS. 6 and 7, based on the parameter data $Pi_m$ (i=a, b, or c; m=multi-tone or high-speed) supplied from the parameter register section 36*i* (i=a, b, or c)

With this structure, the parameter register 36 and the waveform generators 35*a*, 35*b*, and 35*c* operate as described below.

Figures 8, 10:
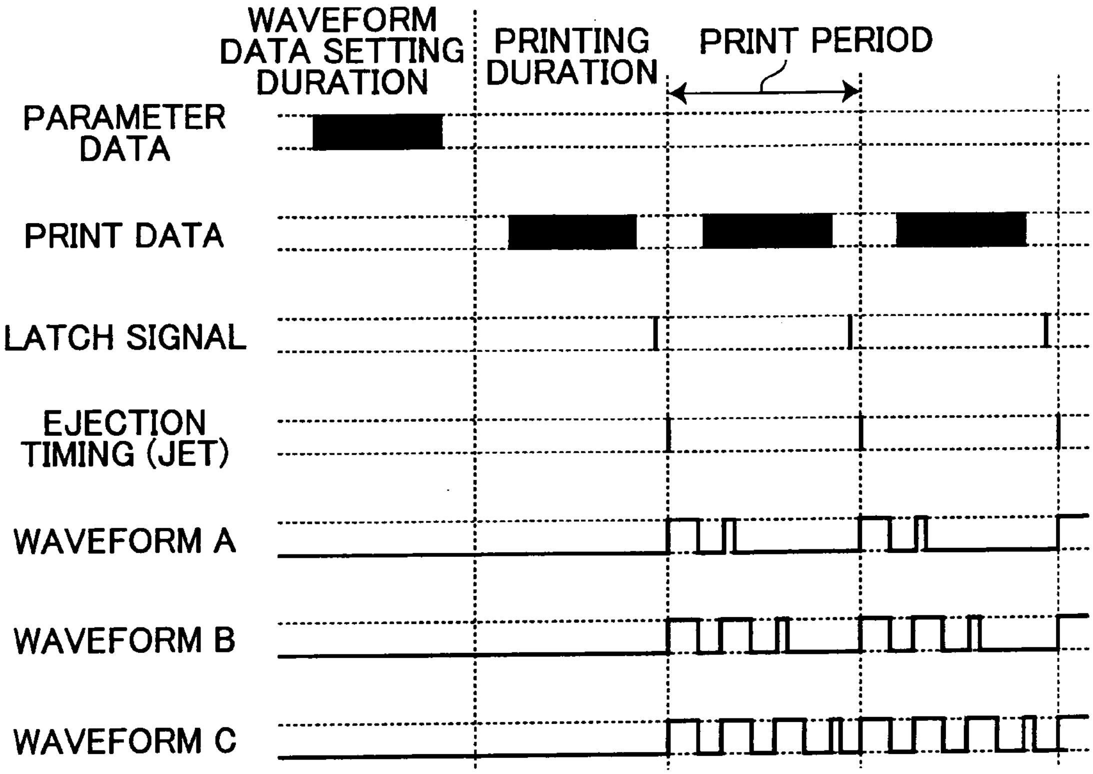
FIG. 8 is a timing chart showing operation of a head driver and the waveform generators.
FIG. 10 shows a truth table used in each selector in the head driver.

As shown in FIG. 8, when some printing mode (multi-tone mode, in this example) is selected, the gate array 22 first performs a parameter data supplying operation during a waveform data setting duration, that is, while a transfer data selection signal is low and therefore no print data is transferred. During the waveform data setting duration, the gate array 22 supplies a group of parameter data (Pa, Pb, Pc), which corresponds to the selected printing mode, to the parameter register 36.

It is noted that each set of parameter data Pi (i=a, b, or c) is constructed from seven sets of eight-bit data. Accordingly, the gate array 22 transmits 21 sets of eight-bit data to the parameter register 36 in serial in synchronization with the transfer clock signal CLK.

In this example, the multi-tone mode is selected. Accordingly, the gate array 22 supplies the parameter register 36 with parameter data $Pa_{multi\text{-}tone}$, $Pb_{multi\text{-}tone}$, and $Pc_{multi\text{-}tone}$. The parameter register section 36*a* (shift register) loads the seven sets of eight-bit data in the parameter data $Pa_{multi\text{-}tone}$ at its output terminals "0"–"6". The parameter register section 36*b* (shift register) loads the seven sets of eight-bit data in the parameter data $Pb_{multi\text{-}tone}$ at its output terminals "0"–"6". The parameter register section 36*c* (shift register) loads the seven sets of eight-bit data in the parameter data $Pc_{multi\text{-}tone}$ at its output terminals "0"–"6".

Thereafter, when a JET signal is simultaneously inputted to the waveform generators 35*a*, 35*b*, and 35*c*, in each waveform generator 35*i* (i=a, b, or c), the duration counter 352 is reset, the RST-F/F circuit 355 is set to output a high level, and the timer 354 is reset to start counting up. The multiplexer 351 outputs the first eight bit data, which is outputted from the output terminal "0" of the corresponding parameter register section 36*i* (i=a, b, or c), to the input terminal of the comparator 353. When the value counted by the timer 354 matches the first eight-bit data from the multiplexer 351, the comparator 353 outputs a matching signal (H) to the trigger input terminal (T) of the RST-F/F circuit 355. As a result, the output of the RST-F/F circuit 355 switches from the high level into the low level. Thus, the first pulse in the waveform $I_{multi\text{-}tone}$ (I=A, B, or C) is generated from the corresponding waveform generator 35*i* (i=a, b, or c). Based on the matching signal (H) from the comparator 353, the duration counter 352 counts up, and instructs the multiplexer 351 to output the second eight-bit data. The timer 354 is reset and restarts counting. The value counted by the timer 354 matches the second eight-bit data, the comparator 353 again generates a matching signal (H). The matching signal is inputted to the trigger input terminal (T) of the RST-F/F circuit 355. The output of the RST-F/F circuit 355 switches from the low level back to the high level. In this way, the RST-F/F circuit 355 outputs the low level signal and the high level signal in alternation.

The zero detector 356 in the waveform generator 35*a* detects when eight-bit data of "00000000" from the terminal "4" and "6" of the parameter register section 36*a* are outputted from the multiplexer 351. The zero detector 356 in the waveform generator 35*b* detects when eight-bit data of "00000000" from the terminal "6" of the parameter register section 36*b* is outputted from the multiplexer 351. When the zero detector 356 thus detects that eight-bit data outputted from the even-numbered terminal of the corresponding parameter register section 35*i* (i=a, b, or c) is zero, the zero detector 356 outputs a stop signal to the duration counter 352, and resets the RST-F/F circuit 355. In this way, during the multi-tone mode, every time the JET signal is transmitted from the gate array 22 to the waveform generators 35*a*–35*c*, the waveform generators 35*a*–35*c* produce waveforms $A_{multi\text{-}tone}$, $B_{multi\text{-}tone}$, and $C_{multi\text{-}tone}$ shown in FIG. 6. The waveform generators 35*a*, 35*b*, and 35*c* repeatedly produce waveforms $A_{multi\text{-}tone}$, $B_{multi\text{-}tone}$, and $C_{multi\text{-}tone}$ as shown in FIG. 8 in synchronization with the JET signals.

Although not shown in the drawing, when the high-speed mode is selected, every time the JET signal is transmitted from the gate array 22, the waveform generators 35*a*, 35*b*, and 35*c* produce waveforms $A_{high\text{-}speed}$, $B_{high\text{-}speed}$, and $C_{high\text{-}speed}$ shown in FIG. 7. The waveform generators 35*a*, 35*b*, and 35*c* repeatedly produce waveforms $A_{high\text{-}speed}$, $B_{high\text{-}speed}$, and $C_{high\text{-}speed}$ as shown in FIG. 7 in synchronization with the JET signals.

Next, the head driver 21 will be described below.

Figure 3:
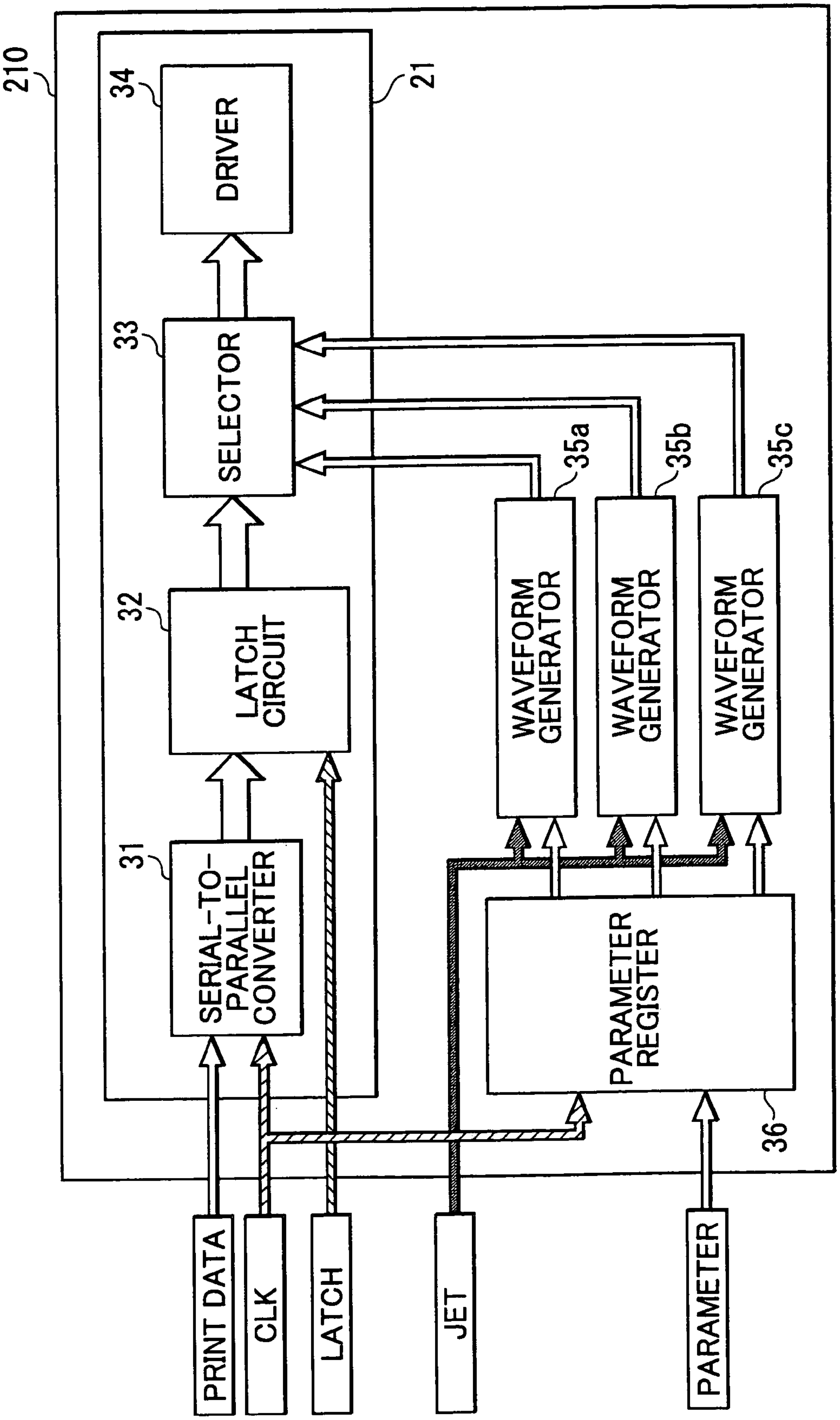
FIG. 3 is a block diagram of a circuit mounted on a carriage board.

As shown in FIG. 3, the head driver 21 (driving circuit) is mounted on the carriage board 210 together with the parameter register 36 and the waveform generators 35*a*–35*c*. The head driver 21 is for driving the print head 3. The head driver 21 is controlled by the gate array 22 to apply each driving element 30 with a driving pulse whose waveform corresponds to print data.

In this example, the print head 3 is a 64-channel multi-nozzle head which is provided with 64 ink ejection channels in total. The print head 3 has 64 driving elements in one to one correspondence with the 64 ink ejection channels. The head driver 21 is designed for driving the 64 channel multi-nozzle head 3.

Figure 9:
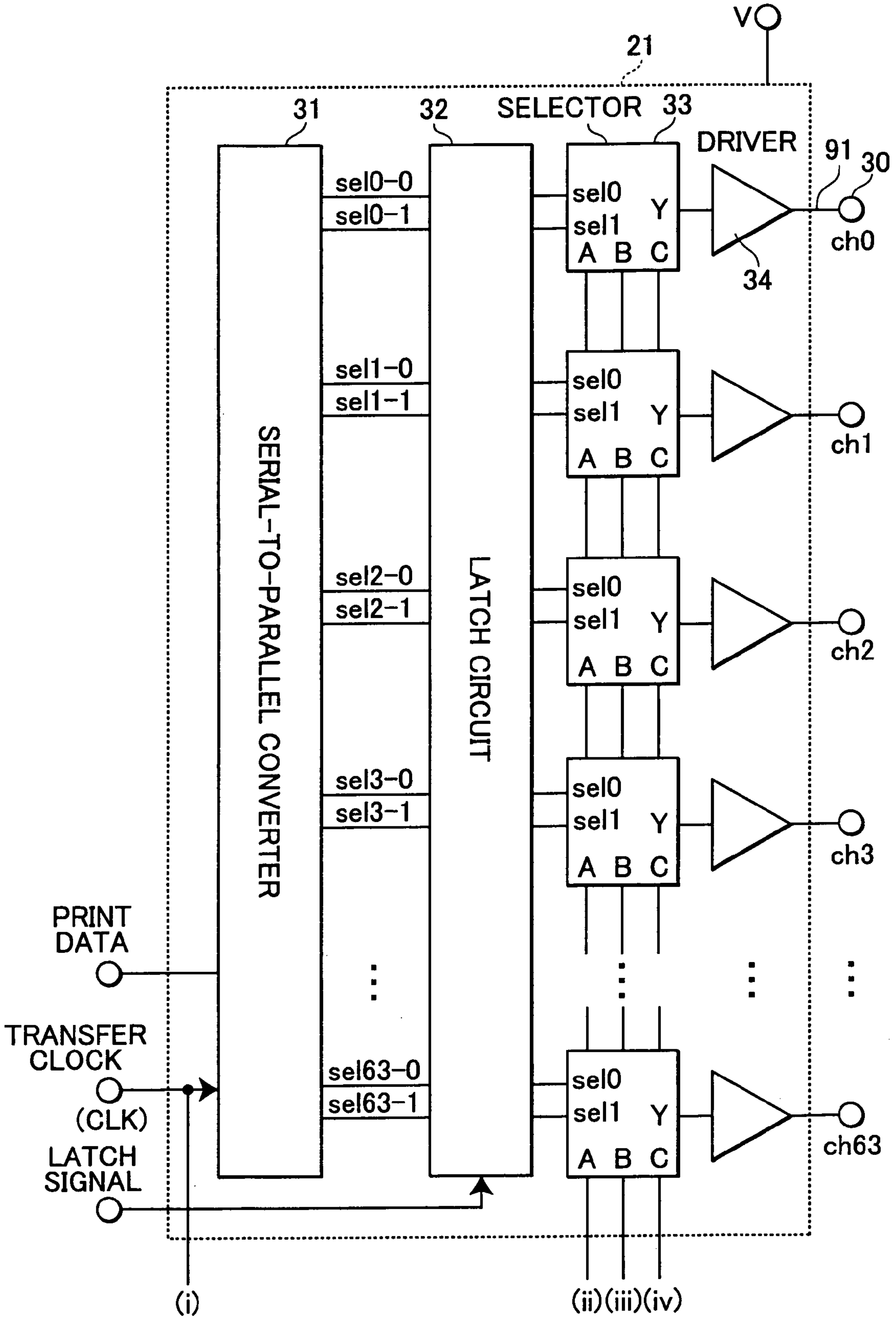
FIG. 9 is a block diagram showing the circuit structure of the head driver.

The head driver 21 will be described below in greater detail with reference to FIGS. 3 and 9.

The head driver 21 has: a serial-to-parallel converter 31, a latch circuit 32, 64 selectors 33, and 64 drivers 34. The 64 drives 34 are connected in one to one correspondence with the 64 driving elements 30 in the 64 channels. The 64 selectors 33 are connected in one to one correspondence with the 64 drivers 34. The serial-to-parallel converter 31 is constructed from a shift register having a 64 bits' worth of length.

The head driver 21 is made from a one-chip integrated circuit.

The serial-to-parallel converter 31 is for receiving 64 sets of print data, which are serially transmitted from the gate array 22 in synchronization with the transfer clock signals CLK. The serial-to-parallel converter 31 converts the 64 sets of print data into 64 sets of parallel data in response to a rising of the transfer clock signal CLK. In this way, the serial-to-parallel converter 31 performs serial-to-parallel conversion.

As described already, each set of print data is constructed from one-bit data "sel-0" and one-bit data "sel-1". The combination of the pair of one-bit data represent: ON/OFF states indicative of print/no print, and selection data for selecting one of the three waveforms A, B, and C in the case of the ON state. For example, during the multi-tone mode, the combination of "sel-0" of zero (0) and "sel-1" of zero (0) indicates no printing. The combination of "sel-0" of zero (0) and "sel-1" of one (1) indicates printing with waveform $A_{multi\text{-}tone}$ to print the smallest dot. The combination of "sel-0" of one (1) and "sel-1" of zero (0) indicates printing with waveform $B_{multi\text{-}tone}$ to print the intermediate dot. The combination of "sel-0" of one (1) and "sel-1" of one (1) indicates printing with waveform $C_{multi\text{-}tone}$ to print the largest dot.

During the high-speed mode, the combination of "sel-0" of zero (0) and "sel-1" of zero (0) indicates no printing. The combination of "sel-0" of zero (0) and "sel-1" of one (1) indicates printing with waveform $A_{high\text{-}speed}$. The combination of "sel-0" of one (1) and "sel-1" of zero (0) indicates printing with waveform $B_{high\text{-}speed}$. The combination of "sel-0" of one (1) and "sel-1" of one (1) indicates printing with waveform $C_{high\text{-}speed}$.

The latch circuit 32 is for latching all the 64 sets of parallel data ("sel-0", "sel-1") in response to a rising of the latch signal which is transmitted from the gate array 22 as shown in FIG. 8.

The 64 selectors 33 are for receiving the 64 sets of parallel data ("sel-0", "sel-1"), which are latched by and supplied from the latch circuit 32. Each of the 64 selectors 33 is also for receiving, at its input terminals (ii)–(iv), the three waveform signals A, B, and C from the waveform generators 35*a*–35*c*. Each selector 33 selects, based on the received set of parallel data ("sel-0", "sel-1"), one of the three kinds of waveform signals A, B, and C, according to the truth table of FIG. 10.

In the truth table in FIG. 10, "0", "1", and "X" are listed on the columns of waveforms A, B, and C. The columns A, B, and C indicate the input terminals (ii), (iii), and (iv) of each selector 33. The value "0" on each column A, B, or C indicates when a low level in a waveform is being inputted to the selector 33 at the corresponding input terminal (ii), (iii), or (iv). The value "1" on each column A, B, or C indicates when a high level in a waveform is being inputted to the selector 33 at the corresponding input terminal (ii), (iii), or (iv). The value "X" on each column A, B, or C indicates when any value of waveform is being inputted to the selector 33 at the corresponding input terminal (ii), (iii), or (iv).

Accordingly to the truth table, therefore, when the one-bit data "sel-0" and "sel-1" are both 0, the selector 33 will output a signal of the value of "0" regardless of when the waveform signals A, B, and C change into high or low level.

When one-bit data "sel-0" is 0 and one-bit data "sel-1" is 1, the selector 33 outputs a signal of the value of "0" when the value of the waveform signal A has a value of "0", that is, when the waveform signal A is in the low level, and outputs a signal of the value of "1" when the value of the waveform signal A has a value of "1", that is, when the waveform signal A is in the high level. Accordingly, the selector 33 outputs a signal whose waveform is the same as the waveform A.

When one-bit data "sel-0" is 1 and one-bit data "sel-1" is 0, the selector 33 outputs a signal of the value of "0" when the value of the waveform signal B has a value of "0", that is, when the waveform signal B is in the low level, and outputs a signal of the value of "1" when the value of the waveform signal B has a value of "1", that is, when the waveform signal B is in the high level. Accordingly, the selector 33 outputs a signal whose waveform is the same as the waveform B.

When one-bit data "sel-0" is 1 and one-bit data "sel-1" is 1, the selector 33 outputs a signal of the value of "0" when the value of the waveform signal C has a value of "0", that is, when the waveform signal C is in the low level, and outputs a signal of the value of "1" when the value of the waveform signal C has a value of "1", that is, when the waveform signal C is in the high level. Accordingly, the selector 33 outputs a signal whose waveform is the same as the waveform C.

With the above-described structure, each selector 33 operates as described below.

During the multi-tone mode, the waveform generators 35*a*, 35*b*, and 35*c* repeatedly generate waveform signals $A_{multi\text{-}tone}$, $B_{multi\text{-}tone}$, and $C_{multi\text{-}tone}$ at a fixed interval in synchronization with the jet timing signals JET as shown in FIG. 8. Each selector 33 selects one of the print waveforms $A_{multi\text{-}tone}$, $B_{multi\text{-}tone}$, and $C_{multi\text{-}tone}$, according to the combination of the pair of one-bit data "sel-0" and one-bit data "sel-1" in the received set of print data as shown in FIG. 10. For example, when the one-bit data "sel-0" and "sel-1" are both 0, the selector 33 selects non-printing. When one-bit data "sel-0" is 0 and one-bit data "sel-1" is 1, the selector 33 selects and outputs waveform $A_{multi\text{-}tone}$. When one-bit data "sel-0" is 1 and one-bit data "sel-1" is 0, the selector 33 selects and outputs waveform $B_{multi\text{-}tone}$. When one-bit data "sel-0" and "sel-1" are both 1, the selector 33 selects and outputs print waveform $C_{multi\text{-}tone}$. In this way, only by receiving two bits' worth of print data, the selector 33 can select three gradations and the non-printing state for each channel.

Similarly, during the high-speed mode, the waveform generators 35*a*, 35*b*, and 35*c* repeatedly generate waveform signals $A_{high\text{-}speed}$, $B_{high\text{-}speed}$, and $C_{high\text{-}speed}$ at a fixed interval in synchronization with the jet timing signals JET. As shown in FIG. 10, each selector 33 selects one of the print waveforms according to the combination of the pair of one-bit data "sel-0" and "sel-1". More specifically, when one-bit data "sel-0" and "sel-1" are both 0, the selector 33 selects non-printing. When one-bit data "sel-0" is 0 and one-bit data "sel-1" is 1, the selector 33 selects and outputs print waveform $A_{high\text{-}speed}$. When one-bit data "sel-0" is 1 and one-bit data "sel-1" is 0, the selector 33 selects and outputs print waveform $B_{high\text{-}speed}$. When one-bit data "sel-0" and "sel-1" are both 1, the selector 33 selects and outputs print waveform $C_{high\text{-}speed}$. In this way, only by receiving two bits' worth of print data, the selector 33 can select three types of dot-history based printing control and non-printing for each channel.

Each driver 34 is for receiving the waveform signal outputted from the corresponding selector 33, and for producing a driving pulse, whose waveform is the same as that of the received waveform signal and whose electric voltage is suitable for the driving elements 30 in the print head 3. Each driver 34 applies the produced driving pulse to the corresponding driving element 30. Upon receipt of the driving pulse, each driving element 30 selectively ejects ink droplets from its corresponding nozzle.

In this way, the plurality of waveform generators 35*a*, 35*b*, and 35*c* repeatedly generate basic waveform signals (print waveform signals) A, B, and C. The head driver 21 selects, for each driving element 30 of the print head 3, a waveform among the waveform signals A, B, and C. For example, during the multi-tone mode, the waveform generators 35*a*, 35*b*, and 35*c* repeatedly generate waveform signals $A_{multi\text{-}tone}$, $B_{multi\text{-}tone}$, and $C_{multi\text{-}tone}$. The head driver 21 selects, for each driving element 30 of the print head 3, a waveform among the waveform signals $A_{multi\text{-}tone}$, $B_{multi\text{-}tone}$, and $C_{multi\text{-}tone}$, and produces a driving pulse of the selected waveform. During the high-speed mode, the waveform generators 35*a*, 35*b*, and 35*c* repeatedly generate waveform signals $A_{high\text{-}speed}$, $B_{high\text{-}speed}$, and $C_{high\text{-}speed}$. The head driver 21 selects, for each driving element 30 of the print head 3, a waveform among the waveform signals $A_{high\text{-}speed}$, $B_{high\text{-}speed}$, and $C_{high\text{-}speed}$, and produces a driving pulse of the selected waveform. Thus, the head driver 21 performs the selection operation based on the ON/OFF information and the waveform selection information included in the print data.

As described above, according to the present embodiment, the recording device 1 is constructed from the main body 500 having the pair of side frames 503. The sheet transporting mechanism LF is provided in the main body 500. The sheet transporting mechanism LF transports a recording medium such as a sheet of paper P. The carriage 2 is scanned in the main scanning direction with respect to the recording medium P. The recording head 3 is mounted on the carriage 2. The recording head 3 is provided with the plurality of driving elements 30, each for performing dot-shaped recording on the recording medium P upon receipt of a driving pulse. The driver circuit 21 is provided to output a driving pulse to each of the plurality of driving elements 30. The main-body side controller 520 is provided to control the driver circuit 21 to output the driving pulse by transmitting print data (driving signal), representative of image information, to the driver circuit 21. The parameter register 36 receives one group of parameter data ($Pa_m$, $Pb_m$, $Pc_m$) (where m=multi-tone or high-speed) that corresponds to the present recording mode among the plurality of recording modes. The parameter register 36 sends the parameter data $Pa_m$, $Pb_m$, and $Pc_m$ (where m=multi-tone or high-speed) to the waveform generators 35*a*–35*c*. The waveform generators 35*a*, 35*b*, and 35*c* generate signals of waveforms $A_m$, $B_m$, and $C_m$ (where m=multi-tone or high-speed) according to the received parameter data $Pa_m$, $Pb_m$, and $Pc_m$. Thus, the waveform generators 35*a*–35*c* generate the three kinds of basic waveform signals $A_m$, $B_m$, and $C_m$, which determine the waveforms of driving pulses to be used for driving the driving elements 30 of the print head 3.

In the driver circuit 21, the serial-to-parallel converter 31 converts print data, which is serially transmitted from the main body-side controller board 520, into parallel data. The latch circuit 32 latches the parallel-form print data. For each channel, the selector 33 receives a set of print data (sel-0 and sel-1) held in the latch circuit 32. The selector 33 selects one of the waveform signals $A_m$, $B_m$, and $C_m$ in accordance with the received set of print data (sel-0 and sel-1). The driver 34 receives the selected waveform signal, and produces a driving pulse, whose waveform is the same as that of the selected waveform signal, and outputs the driving pulse to the driving element 30. Thus, the print head 3 can perform a great variety of printing operations using the three waveforms A, B, and C.

It is possible to change the waveforms to be generated by the waveform generators 35*a*–35*c* by merely changing the parameter data. It is possible to control the waveform generators 35*a*–35*c* to generate waveform signals $A_{multi\text{-}tone}$, $B_{multi\text{-}tone}$, and $C_{multi\text{-}tone}$ by inputting the parameter data $Pa_{multi\text{-}tone}$, $Pb_{multi\text{-}tone}$, and $Pc_{multi\text{-}tone}$. It is possible to control the waveform generators 35*a*–35*c* generate waveform signals $A_{high\text{-}speed}$, $B_{high\text{-}speed}$, and $C_{high\text{-}speed}$ by inputting the parameter data $Pa_{high\text{-}speed}$, $Pb_{high\text{-}speed}$, and $Pc_{high\text{-}speed}$.

Thus, it is possible to use the same waveform generators 35*a*–35*c* for the plurality of different kinds of recording modes. It is possible to attain a plurality of recording modes without increasing the number of the waveform generators 35. It is therefore possible to perform a variety of recording operations without complicating the internal structure of the controller of the recording head 3.

The parameter register 36 holds therein parameter data Pa, Pb, and Pc to be inputted to the waveform generators 35*a*–35*c* in a rewritable manner, and outputs the parameter data to the waveform generators 35*a*–35*c*. Accordingly, it is possible to easily change the parameter data Pa, Pb, and Pc. It is therefore possible to speedly switch between the different recording modes.

Especially, the ROM 12 stores therein a plurality of groups of parameter data ($Pa_{multi\text{-}tone}$, $Pb_{multi\text{-}tone}$, $Pc_{multi\text{-}tone}$) and ($Pa_{high\text{-}speed}$, $Pb_{high\text{-}speed}$, $Pc_{high\text{-}speed}$) in correspondence with the plurality of recording modes. The CPU 11 selects one group of parameter data ($Pa_{multi\text{-}tone}$, $Pb_{multi\text{-}tone}$, $Pc_{multi\text{-}tone}$) or ($Pa_{high\text{-}speed}$, $Pb_{high\text{-}speed}$, $Pc_{high\text{-}speed}$) in accordance with the recording mode, which is selected at the host computer 26 or at the operation panel 14. The CPU 11 then inputs the selected group of parameter data to the waveform generators 35*a*–35*c*. Accordingly, it is possible to easily determine parameter data for each waveform generator within a short period of time.

In the above description, during the multi-tone recording mode, the three kinds of waveforms $A_{multi\text{-}tone}$, $B_{multi\text{-}tone}$, and $C_{multi\text{-}tone}$ are prepared by changing the pulse number, i.e., the number of the constituent ejection pulses, to one (1) through three (3) while maintaining the pulse width to the fixed value "w". During the high speed recording mode, the three kinds of waveforms $A_{high\text{-}speed}$, $B_{high\text{-}speed}$, and $C_{high\text{-}speed}$ are prepared by changing the pulse width among "w1" to "w3" while maintaining the pulse number to the fixed value of one (1). However, it is possible to prepare other plurality of kinds of waveforms by changing other factors, such as the pulse height (voltage value), the combination of the pulse number and the pulse width or pulse height. Still other plural of kinds of waveforms can be prepared by changing the pulse height while maintaining the pulse period or the pulse width to be fixed.

It is noted that the host computer 26 may transmit a parameter data group (Pa, Pb, Pc), which corresponds to the present recording mode, directly to the gate array 22 or to the parameter register 36.

It is desirable to control dots by inputting a desired waveform from the external device 26 via the interface 27 and the gate array 22. For example, when a user desires to perform a draft printing by thinning out dots, a high quality image is not required. Accordingly, the high speed printing can be performed by modifying the waveforms $A_{high\text{-}speed}$, $B_{high\text{-}speed}$, and $C_{high\text{-}speed}$ to have no stop pulses SP.

In the above description, the waveforms are changed according to the recording mode. However, the waveforms can be changed according to other conditions, such as the shape of the ink flow path. Additionally, the waveforms can be adjusted according to the environmental condition such as the environmental temperature.

In the above description, as shown in FIG. 8, the CPU 11 controls the gate array 22 to transmit a new set of parameter data to the parameter register 36 when the recording device 1 is instructed by the host computer 26 or the operation panel 14 to change the recording mode. Afterwardly, the waveform generators 35a–35c start generating new waveforms that correspond to the new set of parameter data. However, the CPU 11 may control the gate array 22 to transmit a new set of parameter data to the parameter register 36 also when printing of a new page is being started or when print instruction for a new set of print data is inputted. In this case, the CPU 11 can change the waveforms more frequently according to the changes in the environmental temperature and/or in the print conditions. For example, the CPU 11 can change the pulse width of the waveforms. The CPU 11 can omit and add the stop pulse SP from and to the waveforms. The CPU 11 can adjust the waveforms into the most suitable conditions. The recording device 1 can perform printing operation with driving pulses of the thus adjusted waveforms.

In the present embodiment, the recording device 1 is used while switching between the multi-tone recording mode and the high speed recording mode. However, the recording device 1 may be used while switching between other recording modes. For example, the recording device 1 may be used while switching between a normal mode, a draft mode, and a photograph quality mode. During the draft mode, a test printing is performed while limiting the ejection amount of ink in comparison with the normal mode. During the photograph quality mode, the multi-tone recording is performed while producing each dot in a more fine state. These operation modes can be switched by changing the parameter data.

The total number of the waveform generators 35a–35c can be increased. For example, two additional waveform generators 35d and 35e can be added. The waveform generator 35d prepares an additional waveform $B'_{multi\text{-}tone}$ by decreasing the pulse width of the second pulse in the waveform $B_{multi\text{-}tone}$ in FIG. 6. The waveform generator 35e prepares another additional waveform $C'_{multi\text{-}tone}$ by decreasing the pulse widths of the second and third pulses in the waveform $C_{multi\text{-}tone}$ of FIG. 6. In this case, the waveform generators 35a–35d generate waveforms $A_{multi\text{-}tone}$–$C_{multi\text{-}tone}$, $B'_{multi\text{-}tone}$, and $C'_{multi\text{-}tone}$. By selecting one waveform among the five waveforms $A_{multi\text{-}tone}$–$C_{multi\text{-}tone}$, $B'_{multi\text{-}tone}$, and $C'_{multi\text{-}tone}$, each driving element 30 is allowed to perform the dot-history based recording operation during the multi-tone recording mode.

In the above description, the ROM 12 stores therein a group of parameter data ($Pa_{multi\text{-}tone}$, $Pb_{multi\text{-}tone}$, $Pc_{multi\text{-}tone}$) for the multi-tone mode and a group of parameter data ($Pa_{high\text{-}speed}$, $Pb_{high\text{-}speed}$, $Pc_{high\text{-}speed}$) for the high-speed mode. The constituent data $Pa_{multi\text{-}tone}$, $Pb_{multi\text{-}tone}$, and $Pc_{multi\text{-}tone}$ in the parameter data group for the multi-tone mode are indicative of the waveforms $A_{multi\text{-}tone}$, $B_{multi\text{-}tone}$, and $C_{multi\text{-}tone}$ of FIG. 6. The constituent data $Pa_{high\text{-}speed}$, $Pb_{high\text{-}speed}$, and $Pc_{high\text{-}speed}$ in the parameter data group for the high-speed mode are indicative of the waveforms $A_{high\text{-}speed}$, $B_{high\text{-}speed}$, and $C_{high\text{-}speed}$ of FIG. 7. The CPU 11 selects one group of parameter data corresponding to the present recording mode, and transmits the selected group of parameter data to the parameter register 36. When receiving the one group of parameter data, the parameter register 36 holds and outputs, at its output terminals, the constituent parameter data as they are. However, the ROM 12 may store therein: a set of parameter data $P_{multi\text{-}tone}$, which indicates only the multi-tone mode but which does not indicate the respective waveforms of FIG. 6; and a set of parameter data $P_{high\text{-}speed}$, which indicates only the high-speed mode but which does not indicate the respective waveforms of FIG. 7. The CPU 11 selects one set of parameter data $P_{multi\text{-}tone}$ or $P_{high\text{-}speed}$, and transmits the selected parameter data to the parameter register 36. When receiving the parameter data, the parameter register 36 produces a corresponding waveform data group ($Pa_{multi\text{-}tone}$, $Pb_{multi\text{-}tone}$, $Pc_{multi\text{-}tone}$) or ($Pa_{high\text{-}speed}$, $Pb_{high\text{-}speed}$, $Pc_{high\text{-}speed}$), which indicates the waveforms for the selected recording mode, and outputs, at the output terminals, the produced waveform data.

Next, the structure of the carriage board 210 will be described with reference to FIG. 11.

Figure 11:
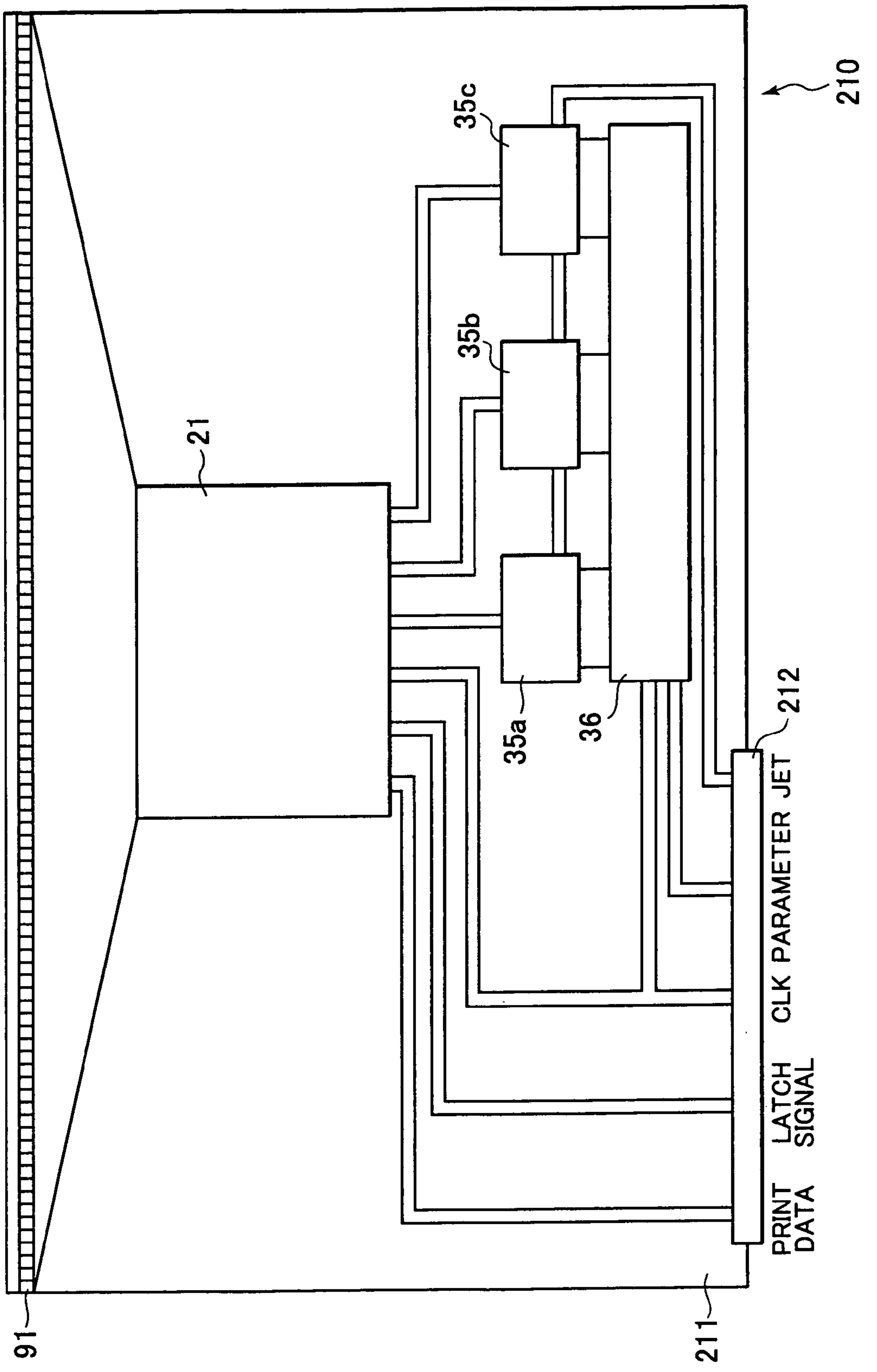
FIG. 11 is a plan view showing a circuit board mounted on the carriage board.

The head driver 21, the waveform generators 35a, 35b, and 35c, and the parameter register 36 are mounted on the carriage board 210 as shown in FIG. 11. The carriage board 210 is provided integrally with the print head unit 508. It is noted, however, that the carriage board 210 may be provided integrally with the carriage 2.

The carriage board 210 includes a circuit board 211 which is formed with a copper film wiring pattern. The head driver 21 is constructed from one chip integrated circuit (IC). The waveform generators 35a, 35b, and 35c are constructed from a gate array or an IC. By using a flip chip method, bare chips of the head driver 21, the waveform generators 35a, 35b, and 35c, and the parameter register 36 are mounted on the circuit board 211. Each bare chip is sealed by an epoxy resin.

As shown in FIG. 11, a plurality of connection electrodes 91 are formed on the carriage board 210. The connection electrodes 91 are provided in one to one correspondence with the plurality of (64, in this example) output terminals of the head driver 21, that is, the plurality of output terminals of the drivers 34. The connection electrodes 91 are supplied with drive pulses from the output terminals of the drivers 34. Although not shown in the drawing, a flexible wire plate is connected between the head driver 21 the print head 3. Each connection electrode 91 is electrically connected via the flexible wire plate to the corresponding driving element 30. The flexible wire plate is made from a polyimide film of 50–150 micron thickness and is formed with a copper film wiring pattern.

The carriage board 210 is also provided with a connector portion 212. The connector portion 212 is connected to the harness cable 28. The connector portion 212 is for receiving, from the harness cable 28, the several signals which are outputted from the gate array 22 in the main body-side controller board 520. The several signals include: print data (driving signals), transfer clock signals CLK, latch signals, parameter data, and ejection timing signals JET.

According to the present embodiment, the waveform generators 35a–35c and the parameter register 36 are mounted on the carriage board 210. The CPU 11 and the ROM 12 are provided in the main body-side controller 520. The ROM 12 stores therein the plurality of groups of parameter data, and the CPU 11 selects one group of parameter data according to the user's selected recording mode. Accordingly, the harness cable 28 can transmit only the one group of parameter data from the main body-side controller board 520 to the carriage board 210. Accordingly, the number of the signal lines mounted within the carriage board 210 can be made small. The harness cable 28 can be made thin relative to the case where the parameter register 36 and the waveform generators 35a–35c are mounted within the main body-side controller board 520 and the harness cable 28 transmits the waveform signals to the carriage board 210. Accordingly, the carriage 2 can be moved smoothly, and can suffer from little noises. Reliability of the recording device 1 can be enhanced.

It is noted that the head driver 21 has a complicated structure. That is, the head driver 21 has both the driver circuits 34 and the logic circuits (the register 31 and the latch circuit 32). The driver circuits 34 are driven with a high voltage. The logic circuits 31 and 32 are driven with a relatively low voltage. The plural waveform generators 35a, 35b, and 35c also have a complicated configuration in order to generate signals of high frequencies. According to the present embodiment, the head driver 21 and the waveform generators 35a, 35b, and 35c are constructed from separate elements. It therefore becomes possible to eliminate several problems that occur if the head driver 21 and the waveform generators 35a, 35b, and 35c are integrated together into a single ASIC (Application Specific Integrated Circuit). That is, if the head driver 21 and the waveform generators 35a, 35b, and 35c are integrated into a single ASIC, the production yield of the ASIC will possibly drop. The production cost will increase. Additionally, the ASIC will possibly become frequently troubled due to the troubles occurring in the waveform generators 35a, 35b, and 35c. The life of the device will be shortened. Contrarily, according to the present embodiment, because the head driver 21 and the waveform generators 35a, 35b, and 35c are constructed from separate elements, the recording device 1 can be made with a low cost, but can reliably perform high quality recording operation.

It is also noted that in the above description, the flip chip method is employed to mount each bare chip on the COB (Chip On Board). However, a wire bonding method can be used. In this case, the wiring pattern on the circuit board 211 has to be formed with a land portion at an outside area of a region where each bare chip is to be mounted. After a bare chip is mounted on the circuit board 211, wires extending from an electrode portion of the bare chip are connected to the land portion.

[Second Embodiment]

Next, a second embodiment of the present invention will be described with reference to FIGS. 12 and 13.

In the above-described first embodiment, the head driver 21, the waveform generators 35a, 35b, and 35c, and the parameter register 36 are mounted together on the same circuit board 211. However, according to the second embodiment of the present invention, the head driver 21 is mounted separately from the waveform generators 35a, 35b, and 35c and the parameter register 36. That is, as shown in FIG. 12, the head driver 21 is mounted on a driver board 210a, while the waveform generators 35a–35c and the parameter register 36 are mounted on a separate connecting board 210b. The driver board 210a is installed inside the print head unit 508. Alternatively, the driver board 210a may be integrally connected to the print head unit 508. The connecting board 210b is detachably mounted on the carriage 2. A flexible wiring cable 213 is employed to connect the driver board 210a and the connecting board 210b with each other.

Thus, according to this second embodiment, the carriage board 210 is constructed from: the driver board 210a, the connecting board 210b, and the flexible wiring cable 213. The driver board 210a is made from a first board 214. The first board 214 is made from a glass epoxy board or a flexible print circuit board. The first board 214 is formed with an electrode pattern. The head driver 21 is mounted on the first board 214. More specifically, by using a flip chip method, the bare chip of the head driver 21 (one chip IC) is mounted on the first board 214. The bare chip is sealed by an epoxy resin.

The connecting board 210b is made from a second board 215. The second board 215 is made from a glass epoxy board or a flexible print wiring board. The second board 215 is formed with an electrode pattern. The waveform generators 35a–35c and the parameter register 36 are mounted on the second board 215. More specifically, by using the flip chip method, the bare chips of the waveform generators 35a, 35b, and 35c (gate array or IC) and the parameter register 36 are mounted on the second board 215. Each bare chip is sealed by an epoxy resin. The connecting board 210b having the above-described structure is detachably mounted on the carriage 2.

The driver board 210a is provided with the plurality of connection electrodes 91 similarly to the carriage board 210 of the first embodiment. The connection electrodes 91 are connected, via the flexible wiring plate (not shown), to the driving elements 30 in the recording head 3. The connecting board 210b is provided with the connector portion 212 similarly to the carriage board 210 of the first embodiment. The connector portion 212 is connected, via the harness cable 28, to the main-body side controller 520.

The flexible wiring cable 213 is connected between the driver board 210a and the connecting board 210b. The flexible wiring cable 213 transmits the waveform signals, produced by the waveform generators 35a–35c, to the selectors 33 as shown in FIG. 13.

Figure 12:
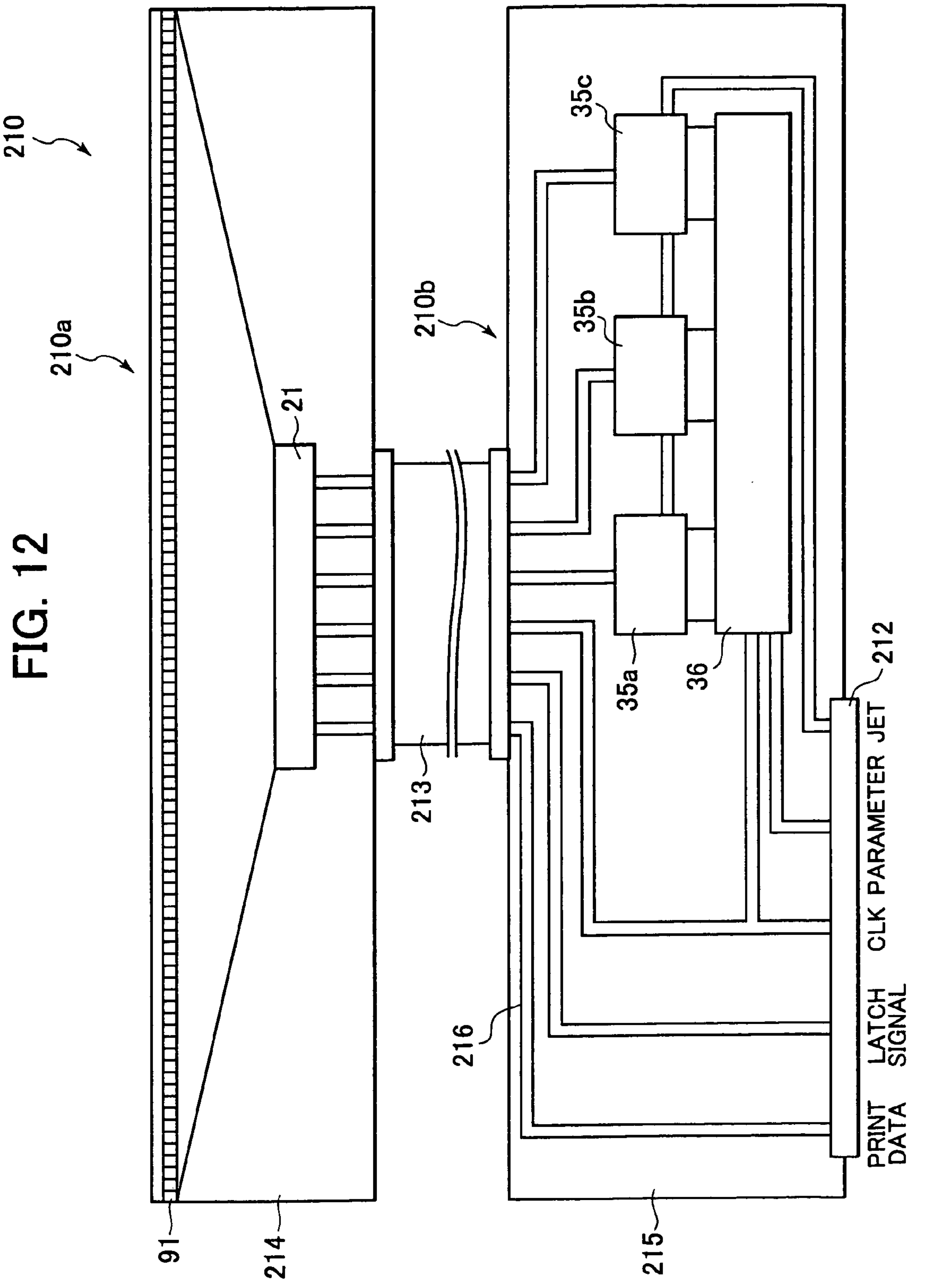
FIG. 12 schematically shows the structure of the carriage board according to a second embodiment.
Figure 13:
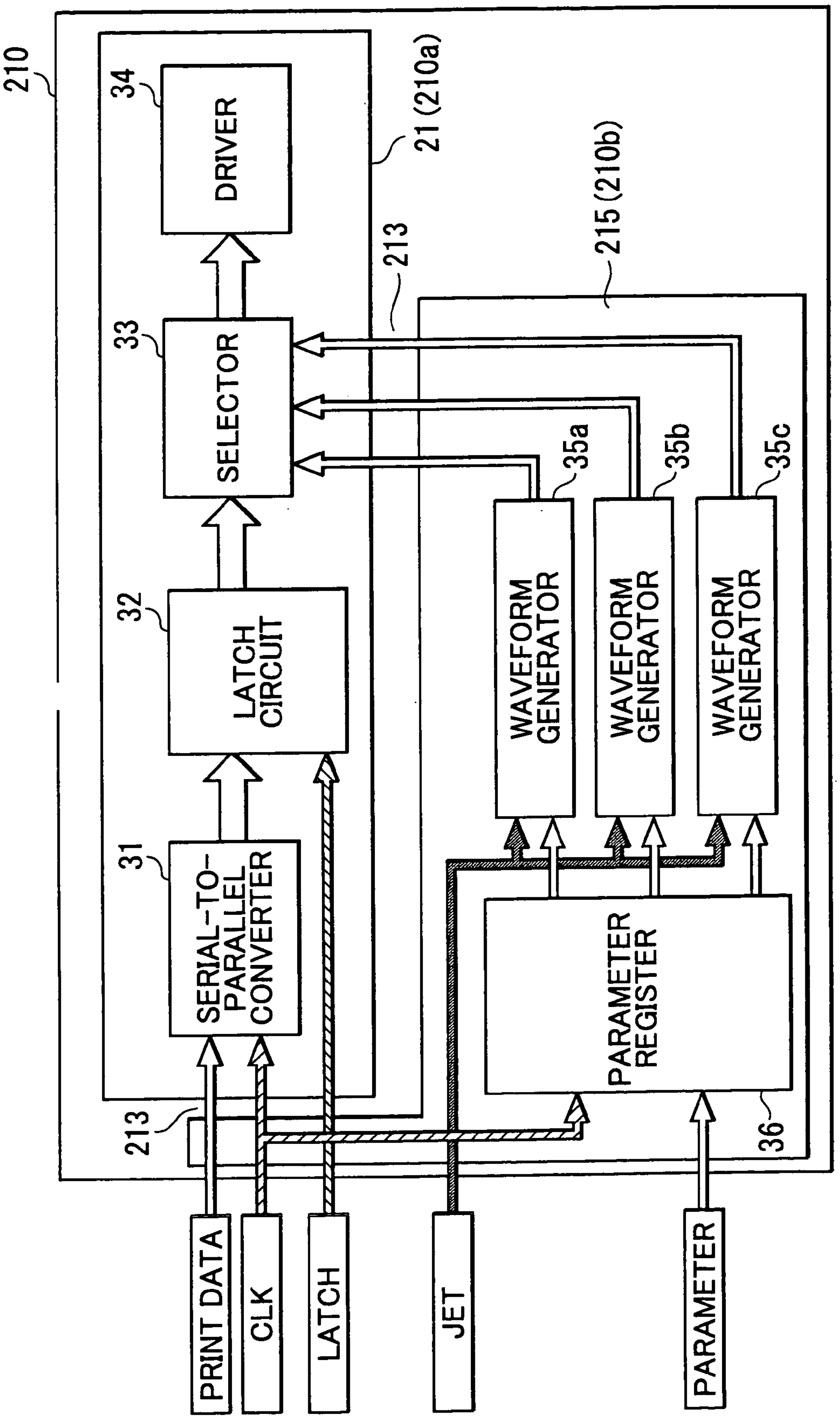
FIG. 13 is a block diagram showing a circuit mounted on the carriage board according to the second embodiment.

As shown in FIG. 12, the connecting board 210b is further provided with a signal path 216 for transmitting the print data, the transfer clock signals CLK, and the latch signals, which are received from the harness cable 28. The flexible wiring cable 213 receives these signals from the connecting board 210b, and transmits these signals to the driver board 210a.

It is noted that the flexible wiring cable 213 is detachable from one of the driver board 210a and the connecting board 210b. When the recording head unit 508 is attached to the carriage 2, the flexible wiring cable 213 is attached to the one of the driver board 210a and the connecting board 210b. With this structure, when one or more waveform generators 35a–35c is damaged, it is possible to replace only the connecting board 210b with a new one. It is unnecessary to replace the head driver 21 (driver IC) with a new one. It is possible to reduce the cost required to repair the damaged waveform generators. In this case, the head driver 21 and the like may not be constructed from bare chips, but may be constructed from an IC package.

According to the present embodiment, the driver circuit 21 and the waveform generators 35*a*–35*c* are produced by separate elements and are mounted on the separate boards 210*a* and 210*b*. Accordingly, the entire device 1 can be produced less costly and can perform more reliable operation.

The head driver (integration circuit) 21, which is constructed by integrating together the data transmission logic circuits, such as the serial-to-parallel converter 31, the latch circuit 32, the selectors 33, and the drivers 34, can be prepared by using a general-purpose integrated circuit, such as a driver IC for a fluorescent lamp and a driver IC for a thermal head. The entire device 1 can therefore be produced less costly.

Except for the above-described points, the recording device 1 of the present embodiment is the same as that of the first embodiment.

Thus, according to the present embodiment, the main body 500 of the recording device 1 of the present embodiment has the pair of side frames 503. The sheet transporting mechanism LF is provided in the main body 500. The sheet transporting mechanism LF transports a recording medium such as a sheet of paper P. The carriage 2 is scanned in the main scanning direction, indicated by an arrow in FIG. 1, with respect to the recording medium P. The recording head 3 is provided in the print head unit 508. The print head unit 508 is mounted on the carriage 2. The recording head 3 is provided with a plurality of driving elements 30, each for performing dot-shaped recording on the recording medium P upon receipt of a driving pulse. The driver circuit 21 is provided on the driver board 210*b*, which is mounted on the print head unit 508. The driver circuit 21 is for outputting a driving pulse to each of the plurality of driving elements 30. The main-body side controller 520 is mounted in the main body 500. The main-body side controller 520 controls the driver circuit 21 to output the driving pulse by transmitting print data (driving signal), representative of image information, to the driver circuit 21. The connecting board 210*b* is mounted on the carriage 2, which mounts thereon the print head unit 508, and is connected between the driver circuit 21 and the main-body side controller 520. The waveform generators 35*a*, 35*b*, and 35*c* are mounted on the connecting board 210*b*, and generate waveform signals A, B, and C. In the driver circuit 21, the waveform selector 33 selects, for each driving element 30, one of the waveforms A, B, and C based on the print data supplied from the main-body controller 520.

In the driver circuit 21, print data serially transmitted from the main body-side controller board 520 is converted by the serial-to-parallel converter 31 into parallel data that corresponds to the plurality of driving elements 30. The parallel-form print data is then held in the latch circuit 32. The selector 33 selects, for each driving element 30, one waveform in accordance with the print data held in the latch circuit, and outputs the selected waveform via the driver 34. Thus, it is possible to perform a great variety of printing operations using the several waveforms A, B, and C.

Similarly to the first embodiment, the parameter register 36 receives one group of parameter data, indicative of several waveforms of the present recording mode, from the main body-side controller board 520. The parameter register 36 sends the constituent parameter data in the received parameter data group to the waveform generators 35*a*–35*c*. The waveform generators 35*a*, 35*b*, and 35*c* generate signals of waveforms A, B, and C according to the received parameter data. Thus, the waveform generators 35*a*–35*c* generate the three kinds of basic waveform signals A–C, which are used to determine waveforms of driving pulses for driving the driving elements 30 of the print head 3. The selector 33 selects, for each driving element 30, a desired basic waveform signal from the three kinds of basic waveform signals in accordance with the print data (image information). The driver 34 produces a driving pulse based on the selected basic waveform signal, and outputs the driving pulse to the corresponding driving element 30.

In the above description, the driver board 210*a* is installed within or integrally connected to the print head unit 508. Thus, the driver board 210*a* is mounted on the recording head 3. However, the driver board 210*a* may be mounted directly on the carriage 2 together with the connecting board 210*b*. Also in this case, the driver board 210*a* is connected via the flexible wiring cable 213 to the connecting board 210*b*. By connecting the flexible wiring cable 213 detachably from one of the driver board 210*a* and the connecting board 210*b*, the connecting board 210*b* can be detached from the driver board 210*a*.

The recording device 1 of the present embodiment may be designed to operate only in a single recording mode, such as a multi-tone mode, for example. In this case, the parameter register 36 may be omitted. The gate array 22 does not transmit parameter data to the carriage board 210. The waveform generators 35*a*–35*c* are designed to always generate signals of predetermined waveforms A, B, and C (waveform $A_{multi\text{-}tone}$, $B_{multi\text{-}tone}$, and $C_{multi\text{-}tone}$, in this example) Accordingly, the recording head 3 can be driven to perform the three types of dot printing operations of FIG. 6 to perform a multi-tone printing.

In the above description, the flip chip method is employed to mount each bare chip on the COB. However, similarly to the first embodiment, the wire bonding method can be used.

While the invention has been described in detail with reference to the specific embodiments thereof, it would be apparent to those skilled in the art that various changes and modifications may be made therein without departing from the spirit of the invention, the scope of which is defined by the attached claims.

For example, the above-described embodiments are related to an ink jet recording device. However, the present invention is not limited to the ink jet recording device. The present invention can be applied to other recording devices such as those that employ an impact type recording head or a thermal type recording head. In such a case, waveform can be selected in order to perform the print density gradation control and the dot-history based printing control.

More specifically, when the impact type print head is used, a waveform can be selected for the present printing operation according to whether printing is performed before and after the present printing operation, considering that oscillation of the impact element remains even after ejection of ink. When the thermal type print head is used, a waveform can be selected for the present printing operation according to whether printing is performed before and after the present printing operation, considering that heat remains in the heat-generating element even after ejection of ink.

In the above description, the ink jet head is of a type that a piezoelectric type driving element 30 deforms a corresponding liquid chamber, thereby ejecting ink due to the change in the volume of the liquid chamber. The ink jet head may be of other types. For example, the ink jet head may be of a type where an electric or magnetic field is generated inside the liquid chamber, and ink is ejected from the liquid chamber due to the electromagnetic interaction with ink. In this case, the liquid chamber is not deformed.

The recording device may perform dot-shaped recording not only onto a sheet of paper P but also onto other kinds of recording medium such as an OHP sheet and the like.

What is claimed is:

1. A recording device, comprising:

a recording mode setting unit setting a recording mode among a plurality of recording modes;

a parameter setting unit setting, according to the set recording mode, one set of parameter signals among a plurality of sets of parameter signals, the plurality of sets of parameter signals corresponding to the plurality of recording modes, respectively, each set of parameter signals including several parameter signals;

a waveform generating unit receiving the one set of parameter signals set by the parameter setting unit and producing, based on the received one set of parameter signals, one set of waveforms among a plurality of sets of waveforms, the plurality of sets of waveforms corresponding to the plurality of recording modes, respectively, each set of waveforms including several waveforms;

a plurality of selection units, each selection unit selecting, based on pixel image information, one of the several waveforms which are produced by the waveform generating unit; and a plurality of recording elements which are provided in one to one correspondence with the plurality of selection units, each recording element being supplied with a driving pulse of the one waveform selected by the corresponding selection unit, thereby performing a corresponding dot recording operation.

2. A recording device as claimed in claim 1, wherein the waveform generating unit includes several waveform generating circuits, each waveform generating circuit receiving a corresponding parameter signal in the one set of parameter signals and producing a signal of one waveform that corresponds to the received parameter signal.

3. A recording device as claimed in claim 2, wherein the parameter setting unit includes a parameter holding unit which holds, in a rewritable manner, one set of parameter signals in correspondence with the set recording mode, and which outputs the one set of parameter signal to the waveform generating unit.

4. A recording device as claimed in claim 2, wherein the parameter setting unit includes:

a parameter memory which stores the plurality sets of parameter signals in correspondence with the plurality of recording modes, each set of parameter signal including several parameter signals in correspondence with the several waveform generating units; and a parameter selector which selects the one set of parameter signals based on the set recording mode, and which outputs the selected one set of parameter signals to the waveform generating unit.

5. A recording device as claimed in claim 2, wherein the plurality of recording modes includes: a multi-tone recording mode for recording images in a plurality of different tones; and a high speed recording mode for recording dots at a high speed.

6. A recording device as claimed in claim 1, further comprising:

a main body which includes a main-body side controller;

a carriage which is moved relative to the main body in a main scanning direction; and a recording head unit mounted on the carriage, the recording head unit including the plurality of recording elements and a head driving circuit, wherein the recording mode setting unit is provided in the main-body side controller, and the plurality of selection units are provided in the head driving circuit.

7. A recording device as claimed in claim 6, wherein the recording head unit and the waveform generating unit are mounted on a carriage board, which is provided on the carriage.

8. A recording device as claimed in claim 6, wherein the recording head unit and the waveform generating unit are mounted on a carnage board, which is provided in the recording head unit.

9. A recording device as claimed in claim 6, wherein the waveform generating unit is provided on a connecting board, which is detachably mounted on the carriage in electrical connection with the recording head unit and the main-body side controller.

10. A recording device as claimed in claim 1, wherein the waveform generating unit repeatedly produces the one set of waveforms based on the received one set of parameter signals, each selection unit selecting one of the several waveforms included in the one set of waveforms based on pixel image information.

11. A recording device, comprising:

a main body which includes a main-body side controller, the main-body side controller being provided with a recording mode setting unit and a parameter setting unit, the recording mode setting unit setting a recording mode among a plurality of recording modes, the parameter setting unit setting, according to the set recording mode, one set of parameter signals among a plurality of sets of parameter signals, the plurality of sets of parameter signals corresponding to the plurality of recording modes, respectively, each set of parameter signals including several parameter signals;

a connecting board which includes a waveform generating unit, the waveform generating unit receiving the one set of parameter signals set by the parameter setting unit and producing several waveforms based on the received one set of parameter signals, the waveform generating unit including several waveform generating circuits, each waveform generating circuit receiving a corresponding parameter signal in the one set of parameter signals and producing one waveform that corresponds to the received parameter signal;

a carriage which is moved relative to the main body in a main scanning direction; and a recording head unit mounted on the carriage, the recording head unit including a plurality of selection units and a plurality of recording elements, each selection unit selecting, based on pixel image information, one of the several waveforms which are produced by the waveform generating unit, the plurality of recording elements being provided in one to one correspondence with the plurality of selection units, each recording element being supplied with the one waveform selected by the corresponding selection unit, thereby performing a corresponding dot recording operation, wherein the connecting board is detachably mounted on the carriage in electrical connection with the recording head unit and the main-body side controller.

12. A recording device, comprising:

a main body which includes a main-body side controller, the main-body side controller storing pixel image information;

a connecting board which includes a waveform generating unit for producing signals of several waveforms, the connecting board including a data path for receiving the pixel image information from the main body;

a carriage which is moved relative to the main body in a main scanning direction; and a recording head unit mounted on the carriage, the recording head unit including a plurality of selection units and a plurality of recording elements, each selection unit receiving the pixel image information from the data path in the connecting board and selecting, based on the received pixel image information, one of the several waveform signals which are produced by the waveform generating unit, the plurality of recording elements being provided in one to one correspondence with the plurality of selection units, each recording element being supplied with the one waveform signal selected by the corresponding selection unit, thereby performing a corresponding dot recording operation, wherein the connecting board is detachably mounted on the carriage in electrical connection with the recording head unit and the main-body side controller.

13. A recording device, comprising:

a main body transporting a recording medium;

a carnage scanned in a main scanning direction with respect to the recording medium;

a recording head which is mounted on the carriage and which is provided with a plurality of driving elements, each driving element performing dot-shaped recording on the recording medium upon receipt of a driving pulse;

a driver circuit outputting the driving pulse to each of the plurality of driving elements;

a controller controlling the driver circuit to output the driving pulse by transmitting a driving signal, representative of image information, to the driver circuit;

a parameter input unit inputting parameter data corresponding to a current one of a plurality of recording conditions; and a waveform generating unit generating, according to the received parameter data, one set of waveforms among a plurality of sets of waveforms, the plurality of sets of waveforms corresponding to the plurality of recording conditions, respectively, each set of waveforms including several waveforms the waveform generating unit including several waveform generators, each waveform generator generating a corresponding one of the several waveforms included in the one set of waveforms according to the received parameter data, the driver circuit including a waveform selector selecting, for each of the plurality of driving elements, one of the several waveforms included in the one set of waveforms based on the driving signal supplied from the controller and producing the driving pulse of the selected waveform.

14. A recording device as claimed in claim 13, wherein the parameter input unit inputs the parameter data corresponding to the current recording mode among a plurality of recording modes.

15. A recording device as claimed in claim 14, wherein the parameter data for each recording mode indicates the several waveforms for the subject recording mode.

16. A recording device as claimed in claim 14, wherein the parameter input unit includes a parameter holding unit which holds, in a rewritable manner, one set of parameter data in correspondence with the current recording mode, and which outputs the one set of parameter data to the several waveform generators.

17. A recording device as claimed in claim 14, wherein the parameter input unit includes:

a parameter memory which stores a plurality sets of parameter data in correspondence with the plurality of recording modes, each set of parameter data including several pieces of parameter data in correspondence with the several waveform generators; and a parameter selector which selects the one set of parameter data based on the current recording mode, and which outputs the selected one set of parameter data to the waveform generators.

18. A recording device as claimed in claim 14, wherein the plurality of recording modes includes: a multi-tone recording mode for recording images in a plurality of different tones; and a high speed recording mode for recording dots at a high speed.

19. A recording device as claimed in claim 13, wherein each of the several waveform generators repeatedly generates the corresponding one of the several waveforms according to the received parameter data, the waveform selector selecting, for each driving element, one of the several waveforms based on the driving signal.

20. A recording device, comprising:

a main body transporting a recording medium;

a carriage scanned in a main scanning direction with respect to the recording medium;

a recording head which is mounted on the carriage and which is provided with a plurality of driving elements, each driving element performing dot-shaped recording on the recording medium upon receipt of a driving pulse;

a driver circuit mounted on either one of the recording head and the carriage, the driver circuit outputting the driving pulse to each of the plurality of driving elements;

a main-body side controller, mounted in the main body, controlling the driver circuit to output the driving pulse by transmitting a driving signal, representative of image information, to the driver circuit;

a connecting board mounted on the carriage and connected between the driver circuit and the main-body side controller; and several waveform generators, mounted on the connecting board, generating several waveforms, the driver circuit including a waveform selector selecting, for each of the plurality of driving elements, one of the several waveforms based on the driving signal supplied from the main-body controller, and producing the driving pulse of the selected waveform.

21. A recording device as claimed in claim 20, further comprising a parameter input unit inputting, to the several waveform generators, one set of parameter data corresponding to the present recording mode among a plurality of recording modes, the parameter input unit being provided on the connecting board, the several waveform generators generating the several waveforms that correspond to the received set of parameter data.

22. A recording device as claimed in claim 21, wherein the parameter input unit includes a parameter holding unit, which is mounted on the connecting board and which holds, in a rewritable manner, one set of parameter data in correspondence with the present recording mode, and which outputs the one set of parameter data to the several waveform generators.

23. A recording device as claimed in claim 21, further comprising:

a parameter memory which stores a plurality sets of parameter data in correspondence with the plurality of recording modes, each set of parameter data including several pieces of parameter data in correspondence with the several waveform generators; and a parameter selector which selects the one set of parameter data based on the present recording mode, and which outputs the selected one set of parameter data to the waveform generators.

24. A recording device as claimed in claim 23, wherein the parameter memory and the parameter selector are provided in the main-body side controller.

25. A recording device as claimed in claim 21, wherein the plurality of recording modes includes: a multi-tone recording mode for recording images in a plurality of different tones; and a high speed recording mode for recording dots at a high speed.

26. A recording device, comprising:

a recording mode setting unit setting a recording mode among a plurality of recording modes;

a parameter setting unit setting, according to the set recording mode, one set of parameter signals among a plurality of sets of parameter signals, the plurality of sets of parameter signals corresponding to the plurality of recording modes respectively, each set of parameter signals including several parameter signals;

a waveform generating unit receiving the one set of parameter signals set by the parameter setting unit and generating, based on the received one set of parameter signals, one set of waveforms among a plurality of sets of waveforms, the plurality of sets of waveforms corresponding to the plurality of recording modes, respectively, each set of waveforms including a plurality of waveforms;

a plurality of waveform selecting units, each waveform selecting unit receiving pixel information and the plurality of waveforms being generated by the waveform generating unit, and each of the plurality of waveform selecting units selecting, based on the received pixel image information, one of the plurality of waveforms being received, and outputting the selected one of the plurality of waveforms; and a plurality of recording elements, each recording element being supplied with a driving pulse based on the selected one of the plurality of waveforms being outputted by a corresponding one of the plurality of waveform selecting units, thereby performing a corresponding dot recording operation.

* * * * *